US012463673B2

(12) United States Patent
Regev et al.

(10) Patent No.: US 12,463,673 B2
(45) Date of Patent: Nov. 4, 2025

(54) SIGNAL-TO-NOISE RATIO BALANCING USING SINGULAR VALUE COMBINER PRECODER MATRICES

(71) Applicant: QUALCOMM Incorporated, San Diego, CA (US)

(72) Inventors: Aviv Regev, Tel Aviv (IL); Ronen Shaked, Kfar Saba (IL); Amit Bar-Or Tillinger, Tel Aviv (IL); Elad Meir, Ramat Gan (IL); Yaniv Eistein, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 18/475,039

(22) Filed: Sep. 26, 2023

(65) Prior Publication Data
US 2025/0105867 A1    Mar. 27, 2025

(51) Int. Cl.
*H04B 1/12*    (2006.01)
(52) U.S. Cl.
CPC ...................................... *H04B 1/12* (2013.01)
(58) Field of Classification Search
CPC .......................................................... H04B 1/12
See application file for complete search history.

(56) References Cited

U.S. PATENT DOCUMENTS

| 8,948,150 | B1* | 2/2015 | Zhang | H04J 11/00 370/338 |
| 10,700,912 | B2* | 6/2020 | Herath | H04L 27/3488 |
| 2017/0265145 | A1* | 9/2017 | Benjebbour | H04L 5/0048 |
| 2018/0054334 | A1 | 2/2018 | Sun et al. | |
| 2022/0240269 | A1* | 7/2022 | Minotani | H04W 16/28 |
| 2022/0360408 | A1* | 11/2022 | Jung | H04L 5/0058 |
| 2023/0179269 | A1* | 6/2023 | Davydov | H04B 7/0456 375/267 |
| 2023/0354466 | A1* | 11/2023 | Li | H04W 72/23 |

OTHER PUBLICATIONS

International Search Report and Written Opinion—PCT/US2024/042908—ISA/EPO—Jan. 23, 2025 (2307074WO).
Partial International Search Report—PCT/US2024/042908—ISA/EPO—Nov. 27, 2024 (2307074WO).

* cited by examiner

*Primary Examiner* — Dac V Ha
(74) *Attorney, Agent, or Firm* — Holland & Hart LLP

(57) ABSTRACT

Methods, systems, and devices for wireless communications using a singular value decomposition (SVD) combiner precoder are described. The described techniques may enable a network entity to determine which streams of a set of multiple data streams to combine in the SVD combiner precoder to increase a lowest signal-to-noise ratio of the set of multiple data streams, and which streams of the multiple streams to leave separate. The network entity may determine a precoding matrix using a square matrix α, which may allow the network entity to dynamically combine (e.g., or not combine) data streams. The network entity may transmit an indication to a UE indicating which streams the network entity will combine and which streams the network entity will not combine. The UE may accordingly demodulate the non-combined streams with a relatively less complex demodulator and may demodulate the combined streams with a relatively more complex demodulator.

30 Claims, 16 Drawing Sheets

SIGNAL-TO-NOISE RATIO BALANCING USING SINGULAR VALUE COMBINER PRECODER MATRICES

FIELD OF TECHNOLOGY

The following relates to wireless communications, including signal-to-noise ratio balancing using singular value decomposition (SVD) combiner precoder matrices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support signal-to-noise ratio (SNR) balancing using singular value decomposition (SVD) combiner precoder matrices. For example, the described techniques may enable a network entity to determine which streams of a set of multiple data streams to combine to increase a lowest signal-to-noise ratio of the set of multiple data streams, and which streams of the multiple streams to leave separate. In some cases, the network entity may determine a precoding matrix using a square matrix $\alpha$, which may allow the network entity to dynamically combine some data streams (e.g., while not combining others). The network entity may transmit an indication to a UE indicating which streams the network entity will combine and which streams the network entity will not combine. The UE may accordingly demodulate the non-combined streams with a relatively less complex demodulator (e.g., minimum mean squared error (MMSE)) and may demodulate the combined streams with a relatively more complex demodulator (e.g., a per-stream recursive decoder (PSRD)).

A method for wireless communications by a UE is described. The method may include receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams, receiving, from the network entity, the set of multiple data streams, and demodulating the set of multiple data streams based on the indication.

A UE for wireless communications is described. The UE may include one or more memories storing processor executable code, and one or more processors coupled with the one or more memories. The one or more processors may individually or collectively operable to execute the code to cause the UE to receive, from a network entity, information associated with transmission of a set of multiple data streams over a set of multiple layers, where the information includes an indication of one or more orthogonal data streams of the set of multiple data streams and one or more non-orthogonal data streams of the set of multiple data streams, receive, from the network entity, the set of multiple data streams, and demodulate the set of multiple data streams based on the indication.

Another UE for wireless communications is described. The UE may include means for receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams, means for receiving, from the network entity, the set of multiple data streams, and means for demodulating the set of multiple data streams based on the indication.

A non-transitory computer-readable medium storing code for wireless communications is described. The code may include instructions executable by a processor to receive, from a network entity, information associated with transmission of a set of multiple data streams over a set of multiple layers, where the information includes an indication of one or more orthogonal data streams of the set of multiple data streams and one or more non-orthogonal data streams of the set of multiple data streams, receive, from the network entity, the set of multiple data streams, and demodulate the set of multiple data streams based on the indication.

In some examples of the method, user equipment (UEs), and non-transitory computer-readable medium described herein, demodulating the set of multiple data streams may include operations, features, means, or instructions for demodulating the one or more non-orthogonal data streams using a first demodulator and demodulating the one or more orthogonal data streams using a second demodulator.

In some examples of the method, user equipment (UEs), and non-transitory computer-readable medium described herein, demodulating the set of multiple data streams may include operations, features, means, or instructions for demodulating the one or more non-orthogonal data streams using a first demodulator with a first quantity of hypotheses and demodulating the one or more orthogonal data streams using the first demodulator with a second quantity of hypotheses.

Some examples of the method, user equipment (UEs), and non-transitory computer-readable medium described herein may further include operations, features, means, or instructions for transmitting, to the network entity, a capability message indicating a capability of the UE to demodulate the one or more non-orthogonal data streams.

Some examples of the method, user equipment (UEs), and non-transitory computer-readable medium described herein may further include operations, features, means, or instructions for selecting one or more demodulators based on the indication and based on one or more capabilities of the UE, where the set of multiple data streams may be demodulated using the one or more demodulators.

Some examples of the method, user equipment (UEs), and non-transitory computer-readable medium described herein may further include operations, features, means, or instructions for transmitting, to the network entity, an acknowledgement message in response to the information associated with transmission of the set of multiple data streams.

In some examples of the method, user equipment (UEs), and non-transitory computer-readable medium described herein, the information associated with transmission of the set of multiple data streams may be received via a physical downlink control channel (PDCCH).

In some examples of the method, user equipment (UEs), and non-transitory computer-readable medium described herein, the information associated with transmission of the set of multiple data streams may be received via a control message scheduling the set of multiple data streams.

In some examples of the method, user equipment (UEs), and non-transitory computer-readable medium described herein, the set of multiple data streams may be received via a physical downlink shared channel (PDSCH).

A method for wireless communications by a network entity is described. The method may include transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams and transmitting, to the UE, the set of multiple data streams.

A network entity for wireless communications is described. The network entity may include one or more memories storing processor executable code, and one or more processors coupled with the one or more memories. The one or more processors may individually or collectively operable to execute the code to cause the network entity to transmit, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams and transmit, to the UE, the set of multiple data streams.

Another network entity for wireless communications is described. The network entity may include means for transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams and means for transmitting, to the UE, the set of multiple data streams.

A non-transitory computer-readable medium storing code for wireless communications is described. The code may include instructions executable by a processor to transmit, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams and transmit, to the UE, the set of multiple data streams.

Some examples of the method, network entities, and non-transitory computer-readable medium described herein may further include operations, features, means, or instructions for selecting the matrix based on one or more singular values associated with a channel between the network entity and the UE, where the set of multiple data streams may be transmitted via the channel.

In some examples of the method, network entities, and non-transitory computer-readable medium described herein, the matrix may be selected based on a SNR associated with each respective data stream of the set of multiple data streams.

In some examples of the method, network entities, and non-transitory computer-readable medium described herein, the matrix may be selected based on one or more power constraints, one or more capabilities of the UE, one or more complexity constraints, or some combination thereof.

Some examples of the method, network entities, and non-transitory computer-readable medium described herein may further include operations, features, means, or instructions for determining one or more new singular values associated with the channel and selecting a new matrix based on the one or more new singular values.

Some examples of the method, network entities, and non-transitory computer-readable medium described herein may further include operations, features, means, or instructions for receiving, from the UE, a capability message indicating a capability of the UE to demodulate the one or more non-orthogonal data streams.

Some examples of the method, network entities, and non-transitory computer-readable medium described herein may further include operations, features, means, or instructions for receiving, from the UE, an acknowledgement message in response to the information associated with transmission of the set of multiple data streams.

In some examples of the method, network entities, and non-transitory computer-readable medium described herein, the information associated with transmission of the set of multiple data streams may be transmitted via a PDCCH.

In some examples of the method, network entities, and non-transitory computer-readable medium described herein, the information associated with transmission of the set of multiple data streams may be transmitted via a control message scheduling the set of multiple data streams.

In some examples of the method, network entities, and non-transitory computer-readable medium described herein, the set of multiple data streams may be transmitted via a PDSCH.

DETAILED DESCRIPTION

In some wireless communication systems, a network entity may transmit multiple data streams to a user equipment (UE). In some examples, the network entity may precode each stream to increase a signal-to-noise ratio (SNR) for each stream. For example, the network entity may determine a precoder for the channel comprised of the strongest singular values of the channel. Such a precoder may be referred to as a singular value decomposition (SVD) precoder. However, in some examples, a first stream precoded using the first strongest singular value may have a much higher SNR than another stream (e.g., a fourth stream) precoded using the fourth strongest singular value. The network entity may use a same modulation and coding scheme (MCS) for each stream, and the MCS may therefore be limited by the SNR of the weakest stream. According to various aspects, the network entity may use a combined precoder that combines (e.g., removes orthogonality for) some or all of the singular values of the channel to balance SNRs associated with each data stream to use a relatively higher MCS. However, such mixed streams may be more complex for the UE to decode, and thus non-combined streams may decrease power consumption and complexity for the UE.

Accordingly, techniques described herein may allow for the network entity to determine which streams of the multiple streams to combine and which streams of the multiple streams to leave separate. In some cases, the network entity may determine a precoding matrix using a square matrix α, which may allow the network entity to dynamically combine some data streams (e.g., while not combining others). The network entity may transmit an indication to the UE of which streams the network entity will combine and which streams the network entity will not combine. The UE may accordingly demodulate the non-combined streams with a relatively less complex demodulator (e.g., minimum mean squared error (MMSE)) and may demodulate the combined streams with a relatively more complex demodulator (e.g., a per-stream recursive decoder (PSRD)).

Aspects of the disclosure are initially described in the context of wireless communications systems. Aspects of the disclosure are further described with reference to process flow diagrams. Aspects of the disclosure are further illustrated by and described with reference to apparatus diagrams, system diagrams, and flowcharts that relate to SNR balancing using singular value combiner precoder matrices.

Figure 1:
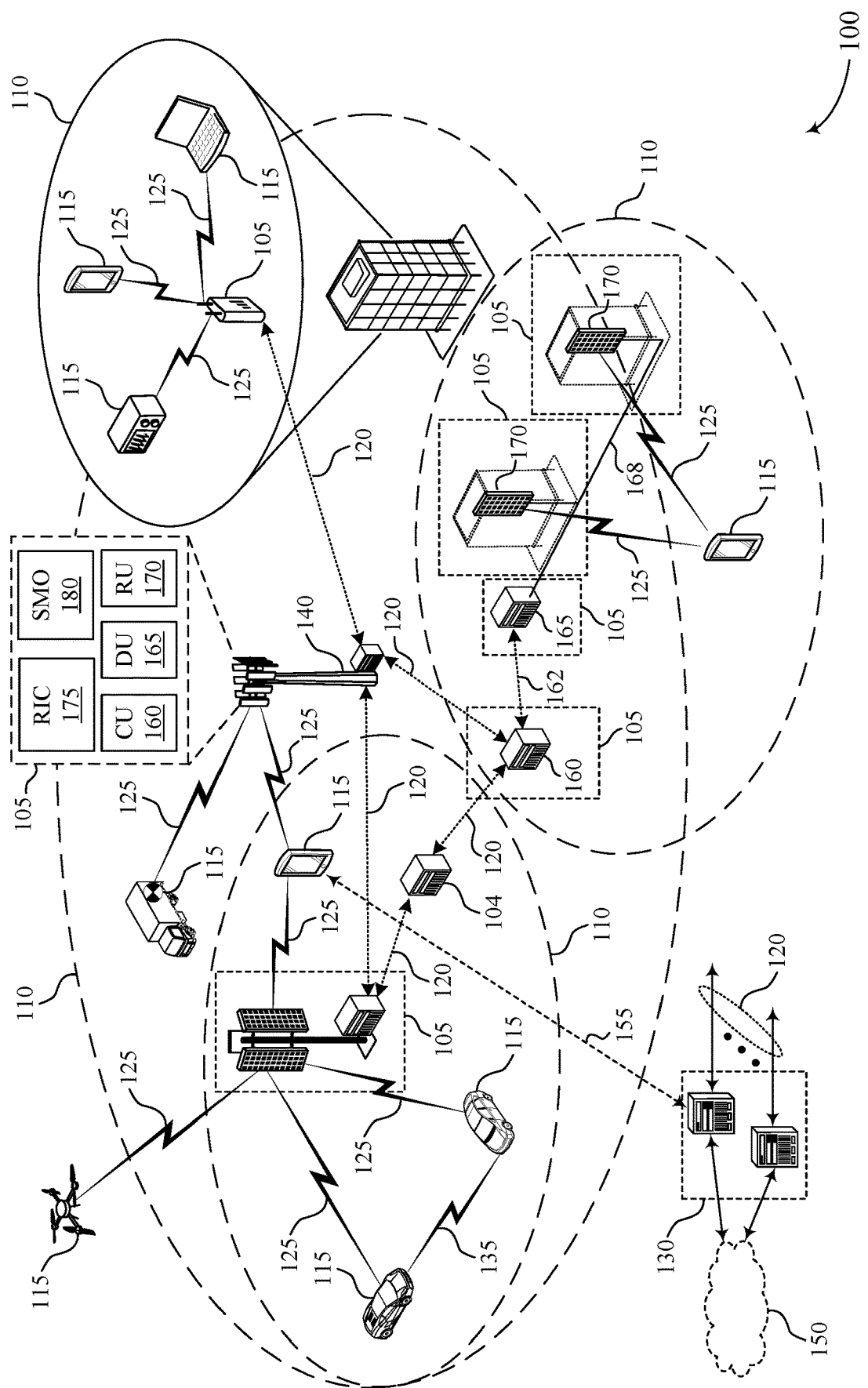
FIG. 1 shows an example of a wireless communications system that supports signal-to-noise ratio (SNR) balancing using singular value decomposition (SVD) combiner precoder matrices in accordance with one or more aspects of the present disclosure.

FIG. 1 shows an example of a wireless communications system 100 that supports SNR balancing using singular value combiner precoder matrices in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support SNR balancing using singular value combiner precoder matrices as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest SNR, or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Techniques described herein may allow for a network entity 105 to determine which streams of a set of multiple data streams to combine and which streams of the multiple data streams to not combine (e.g., leave separate). In some cases, the network entity 105 may determine a precoding matrix using a square matrix α, which may allow the network entity 105 to dynamically combine one or more data streams (e.g., and not combine other data streams). The network entity 105 may transmit an indication to a UE 115 of which streams the network entity 105 will combine and which streams the network entity 105 will not combine. The UE 115 may accordingly demodulate the non-combined streams with a relatively less complex demodulator (e.g., an MMSE-based demodulator) and may demodulate the combined streams with a relatively more complex demodulator (e.g., a PSRD-based demodulator).

Figure 2:
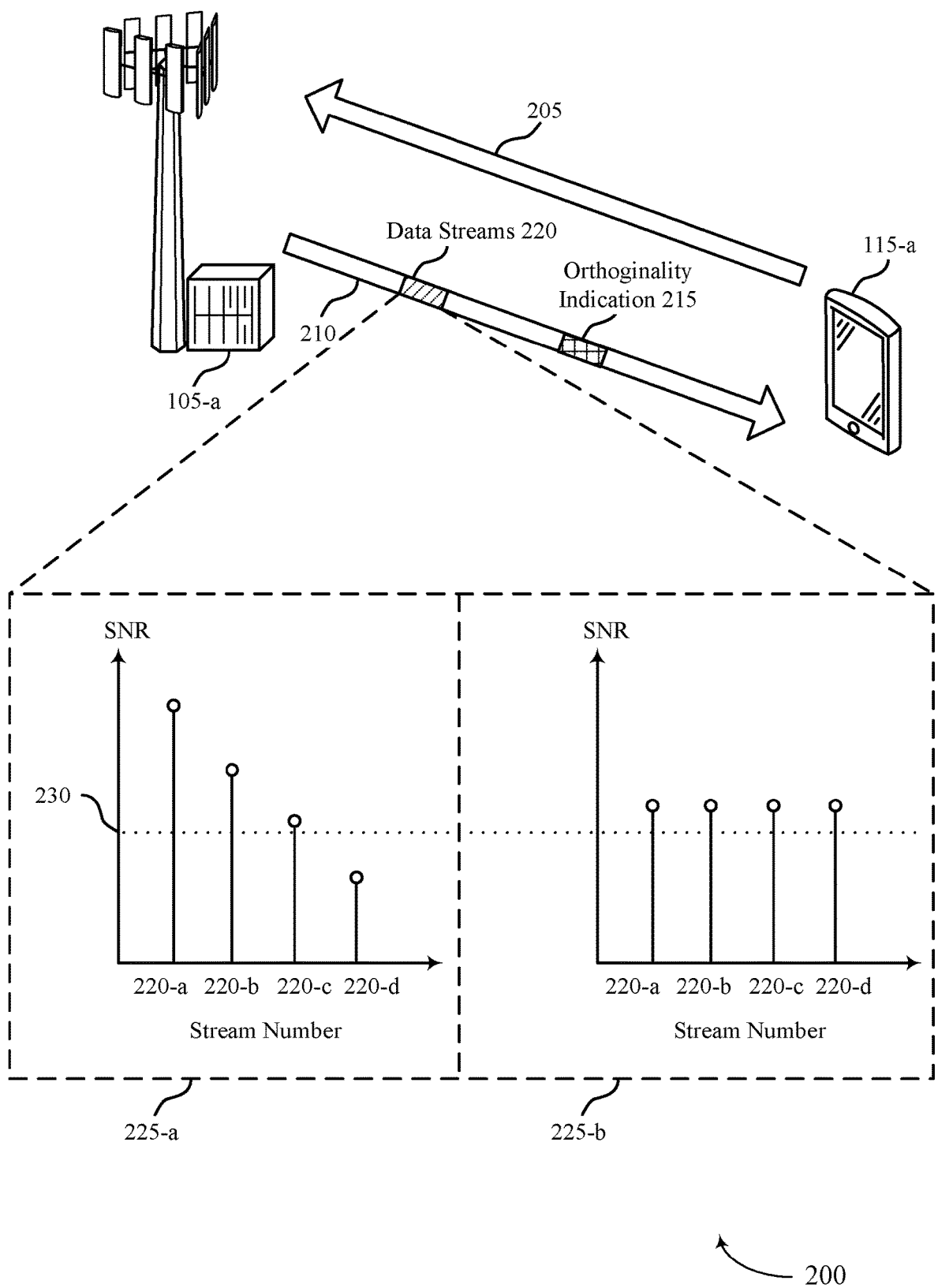
FIG. 2 shows an example of a wireless communications system that supports SNR balancing using SVD combiner precoder matrices in accordance with one or more aspects of the present disclosure.

FIG. 2 shows an example of a wireless communications system 200 that supports SNR balancing using SVD combiner precoder matrices in accordance with one or more aspects of the present disclosure. The wireless communications system 200 may implement or may be implemented by aspects of the wireless communications system 100. For example, the wireless communications system 200 may include a UE 115 (e.g., a UE 115-*b*) and a network entity 105 (e.g., a network entity 105-*b*), which may be examples of the corresponding devices as described with reference to FIG. 1.

In some wireless communication systems, a network entity 105-*a* may transmit one or more data streams 220 to a UE 115-*a* as part of MIMO communications. The network entity 105-*a* may utilize SVD precoding to precode one or more data streams 220 to increase (e.g., maximize) a respective SNR associated with each data stream 220. The network entity 105-*a* may multiply a vector x (e.g., a streams vector) with a precoder vector P (e.g., a vector comprised of one or more singular values of a channel, such as a downlink channel 210). Accordingly, each data stream 220 of the one or more data streams 220 may have a different SNR. The SNR of an $i^{th}$ data stream 220 may be defined according to Equation 1.

$$SNR_i = \frac{\sigma_i^2 \sigma_x^2}{\sigma_n^2} = \sigma_i^2 * SNR \qquad (1)$$

As described with reference to Equation 1, $\sigma_i^2$ may be the $i^{th}$ strongest singular value of the channel, $\sigma_x^2$ may be a power of a signal (e.g., a transmission power of the $i^{th}$ data stream 220), and $\sigma_n^2$ may be a power of noise associated with the channel.

Accordingly, each data stream 220 of the one or more data streams 220 may have a different channel capacity. As such, the network entity 105-*a* may have a different MCS restriction associated with modulating each respective data stream 220. To increase (e.g., maximize) a throughput, the network entity 105-*a* may modulate each data stream 220 with a different MCS according to each respective MCS restriction (e.g., based on each SNR or channel capacity). However, in some examples, the network entity 105-*a* may have a limited quantity of transport blocks, and thus may also have a limited quantity of MCSs which the network entity 105-*a* may apply to the data streams 220. The network entity 105-*a* may therefore modulate all data streams 220 of the plurality of data streams 220 using a same (e.g., a single fixed) MCS. Thus, the network entity 105-*a* may modulate each data stream 220 using an MCS determined by the weakest data stream 220 (e.g., the data stream 220 associated with a weakest singular value, such as a data stream 220-*d*). For example, the network entity 105-*a* may precode a data stream 220-*a*, a data stream 220-*b*, a data stream 220-*c*, and the data stream 220-*d*. As illustrated with reference to SNR diagram 225-*a*, the data stream 220-*d* may have an SNR that is below an SNR threshold 230, which may result in a limited MCS for all of the data streams 220.

In such examples, the network entity 105-*a* may use a SVD precoder with the first strongest $N_{ss}$ singular values of the channel, where $N_{ss}$ may be defined as a quantity of data streams 220. The precoder $P_k$ may be defined as $P_k = V_k(:, 1:N_{ss})$, where the SVD of the channel $H_k$ may be defined as $svd(H_k) = U_k \Sigma_k V_k$, where k may be a frequency index of the data streams, $U_k$ may be the left singular values, $\Sigma_k$ may be the eigenvalues of the channel, and $V_k$ may be the right singular values of the channel. After receiving the data streams 220, the UE 115-*a* may multiply an observed signal $y_k$ by the left singular values $U'_k$, which may result in an observed signal k defined by Equation 2.

$$\tilde{y}_k = U'_k y_k = U'_k(H_k P_k x_k + n_k) = U'_k U_k \Sigma_k V'_k V_k x_k + \tilde{n}_k = \Sigma_k x_k + \tilde{n}_k \quad (2)$$

As described with reference to Equation 2, $y_k$ may be a matrix of dimensions ($N_{Rx}$, 1) (e.g., which may have dimensions of a quantity of receive antennas of the UE 115-*a* by one) defining the observed signal, $H_k$ may be a matrix of dimensions ($N_{Rx}$, $N_{Tx}$) (e.g., which may have dimensions of the quantity of receive antennas by a quantity of transmit antennas of the network entity 105-*a*) defining the channel, $P_k$ may be a matrix of dimensions ($N_{ss}$, $N_{Tx}$) defining the precoder, $x_k$ may be a matrix of dimensions ($N_{ss}$, 1) defining the transmitted data streams 220, and $n_k$ may be a matrix of dimensions ($N_{Rx}$, 1) defining additive noise.

Techniques described herein may enable the network entity 105-*a* to increase a lowest SNR and us a MCS restriction associated with the plurality of data streams 220. For example, the network entity 105-*a* may apply a SVD combiner precoder matrix α to precode the plurality of data streams 220. The SVD combiner precoder matrix may combine the data streams 220 (e.g., such that at least some of the data streams 220 are non-orthogonal), and may balance or average an SNR of the data streams 220. For example, as illustrated with reference to SNR diagram 225-*b*, the network entity 105-*a* may precode each data stream 220 with the SVD combiner precoder matrix, which may balance (e.g., average) an SNR associated with each of the data streams 220. The lowest SNR of the data streams 220 may accordingly be larger than the SNR threshold 230, which may increase an MCS that the network entity 105-*a* may use to modulate the data streams 220. The SVD combiner precoder used by the network entity 105-*a* may be defined as $P_k = V_k(:, 1:N_{ss})\alpha_k$, where entries in row m and column n of the matrix $\alpha_k$ may be defined according to Equation 3.

$$\alpha_k(m, n) = \frac{1}{\sqrt{N_{SS}}} \exp\left(-2\pi j \frac{nm}{N_{SS}}\right) 1 \le m, n \le N_{SS} \quad (3)$$

where Nss may be a quantity of receive antennas at the UE 115-*a*.

However, the combined or non-orthogonal data streams 220 may be mixed at a receiver of the UE 115-*a* (e.g., as opposed to non-combined or orthogonal data streams 220, which may be separated at the UE 115-*a*). Thus, demodulating the combined or non-orthogonal data streams 220 may increase complexity for the UE 115-*a* (e.g., as compared to demodulating non-combined or orthogonal data streams 220).

Accordingly, the network entity 105-*a* may apply a different SVD combiner precoder matrix α. The network entity 105-*a* may apply a precoder matrix that may combine some of the data streams 220 (e.g., the data stream 220-*a* and the data stream 220-*d*) and may not combine some of the data streams 220 (e.g., the data stream 220-*b* and the data stream 220-*c*). The network entity 105-*a* may therefore combine or mix data streams 220 if the corresponding SNRs should be balanced (e.g., to achieve the SNR threshold 230). As an illustrative example, the network entity 105-*a* may determine singular values of the channel to be $\sigma^2 = [15, 12, 12, 1]$ dB. In such an example, the network entity 105-*a* may determine to balance the first and fourth singular values (e.g., with a gap of 14 dB) and to not combine (e.g., leave unmixed) the second or third singular values. The network entity 105-*a* may accordingly select a matrix α (e.g., of dimensions ($N_{ss}$, $N_{ss}$)) which may combine, for example, the first and fourth data stream 220. Such a matrix may be defined as $$\alpha = \begin{bmatrix} \sqrt{0.5} & 0 & 0 & \sqrt{0.5} \\ 0 & 1 & 0 & 0 \\ 0 & 0 & 1 & 0 \\ \sqrt{0.5} & 0 & 0 & -\sqrt{0.5} \end{bmatrix}.$$

In some examples, the network entity 105-*a* may select a different matrix α to combine one or more different data streams 220 and to not combine one or more other data streams 220. The selected matrix α may preserve transmission power of the data streams 220 and may have orthogonal columns. The network entity 105-*a* may accordingly dynamically balance the SNR of each data stream 220 to gain a subspace of a strongest singular value.

The network entity 105-*a* may select the matrix α based on the singular values of the channel, which the network entity 105-*a* may determine based on, for example, reciprocity or feedback from the UE 115-*a* (e.g., over an uplink channel 205). The network entity 105-*a* may select the matrix α based on criteria such as balancing the SNR per data stream 220, separating the data streams 220 (e.g., to reduce a complexity of demodulation), or other system limitations or constraints (complexity, power constraints, etc.). In some examples, the network entity 105-*a* may receive a capability message from the UE 115-*a* indicating a capability of the UE 115-*a* to demodulate non-orthogonal data streams 220, and the network entity 105-*a* may select the matrix α based on the capability message.

In some examples, the channel may change over time. In such examples, the network entity 105-*a* may receive or determine one or more new singular values and may select a new matrix α to update the SVD combiner precoder (e.g., at a same rate as updating a non-combiner SVD precoder).

The network entity 105-*a* may transmit an orthogonality indication 215 to the UE 115-*a* indicating which data streams 220 of the plurality of data streams 220 the network entity 105-*a* will combine (e.g., and which data streams 220 the network entity 105-*a* will not combine). The indication 215 may be, for example, an array of 0s and 1s, such as an array (1, 0, 0, 1) to indicate that the data stream 220-*a* and the data stream 220-*d* may be combined and that the data stream 220-*b* and the data stream 220-*c* may not be combined (e.g., or vice-versa). The indication 215 may be transmitted, for example, via physical level signaling in a physical downlink control channel (PDCCH) (e.g., when the network entity 105-*a* selects a new matrix α or via a scheduling or grant PDCCH scheduling the data streams 220). In some examples, the UE 115-*a* may transmit an acknowledgement message in response to receiving the indication 215 (e.g., via the uplink channel 205).

The UE 115-*a* may receive the data streams 220 via the downlink channel 210 (e.g., a physical downlink shared channel (PDSCH)). The UE 115-*a* may accordingly demodulate the data streams 220 based on the indication 215. In some cases, the UE 115-*a* may demodulate the combined data streams 220 differently from the non-combined data streams 220 (e.g., to reduce processing and complexity). For example, to demodulate orthogonal (e.g., non-combined) data streams 220, the UE 115-*a* may treat the data streams 220 as separated parallel single-input single-output (SISO) streams. The UE 115-*a* may demodulate the orthogonal data streams 220 using a MMSE demodulator, which may have noise enhancement for MIMO streams and not for SISO streams. To demodulate non-orthogonal (e.g., combined) data streams 220, the UE 115-*a* may use a demodulator which does not have noise enhancement for MIMO streams, such as a PSRD demodulator.

In some examples, the UE 115-*a* may use a more complex (e.g., smarter) demodulator such as the PSRD demodulator for both of the orthogonal data streams 220 and the non-orthogonal data streams 220. The UE 115-*a* may use the PSRD demodulator with a first quantity of hypotheses for the non-orthogonal data streams 220, and may use the PSRD demodulator with a second quantity of (e.g., fewer) hypotheses for the orthogonal data streams 220. Accordingly, the network entity 105-*a* may modulate the data streams 220 with a relatively higher MCS, and the UE 115-*a* may demodulate the data streams 220 with relatively less complexity and processing.

Figure 3:
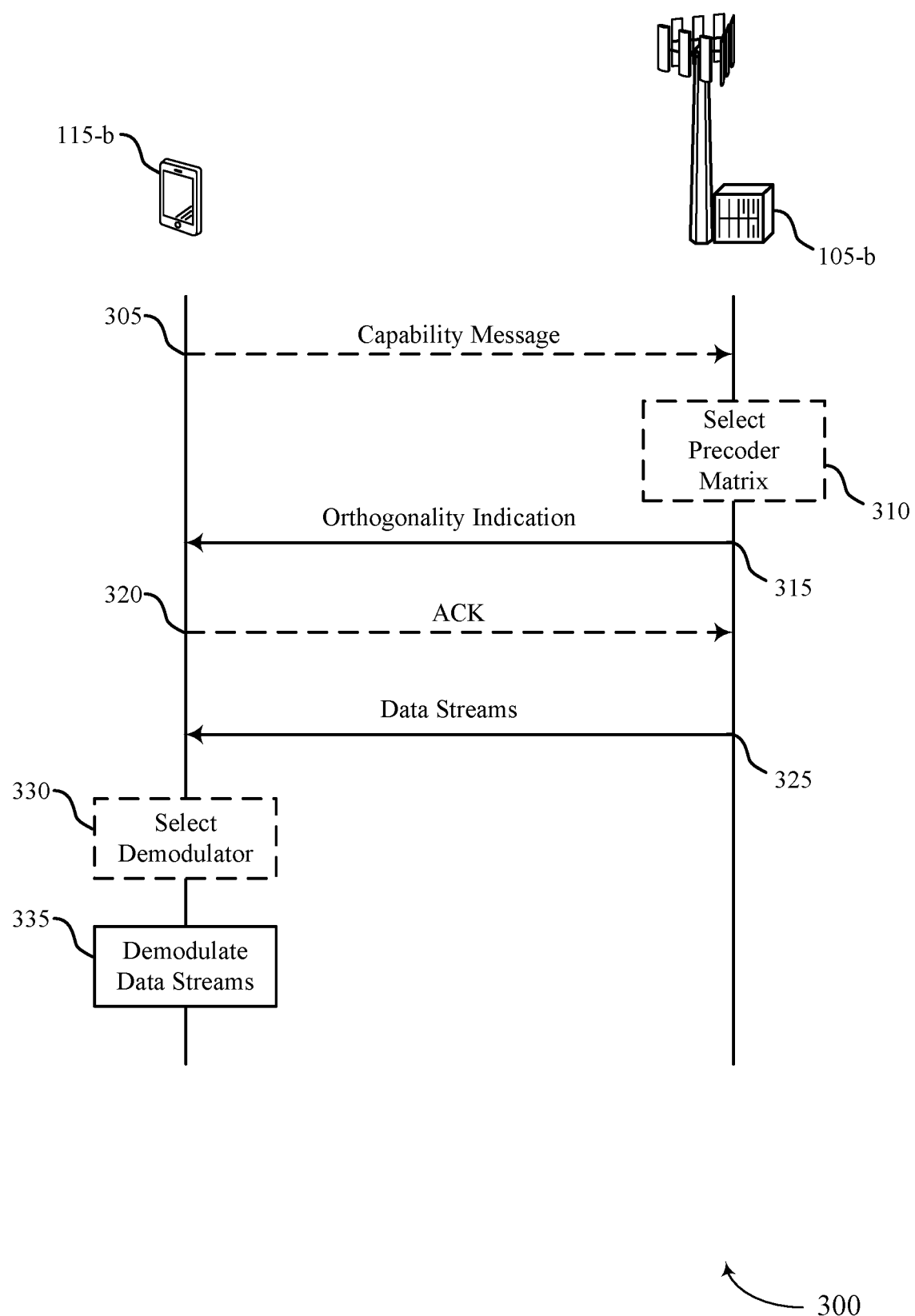
FIG. 3 shows an example of a process flow that supports SNR balancing using SVD combiner precoder matrices in accordance with one or more aspects of the present disclosure.

FIG. 3 shows an example of a process flow 300 that supports SNR balancing using SVD combiner precoder matrices in accordance with one or more aspects of the present disclosure. The process flow 300 may implement or may be implemented by aspects of the wireless communications system 100 or the wireless communications system 200. For example, the process flow 300 may include a UE 115 (e.g., a UE 115-*b*) and a network entity 105 (e.g., a network entity 105-*b*), which may be examples of the corresponding devices as described with reference to FIG. 1.

In the following description of the process flow 300, the operations between the UE 115-*b* and the network entity 105-*b* may be transmitted in a different order than the example order shown. Some operations may also be omitted from the process flow 300, and other operations may be added to the process flow 300. Further, although some operations or signaling may be shown to occur at different times for discussion purposes, these operations may actually occur at the same time.

In some examples, at 305, the UE 115-*b* may transmit, to the network entity 105-*b*, a capability message indicating a capability of the UE 115-*b* to demodulate one or more non-orthogonal data streams. The capability message may indicate a capability of the UE 115-*b* to demodulate data streams that have been combined by the network entity 105-*b* using a precoder (e.g., with a matrix that combines the one or more non-orthogonal data streams). The capability message may further indicate a capability of the UE 115-*b* to demodulate one or more orthogonal data streams (e.g., that have not been combined by the network entity 105-*b*). The UE 115-*b* may transmit the capability message via an uplink channel (e.g., a physical uplink control channel (PUCCH) or a physical uplink shared channel (PUSCH)).

In some examples, at 310, the network entity 105-*b* may select the matrix for the precoder. The network entity 105-*b* may select a square matrix α that may combine one or more data streams of a plurality of data streams (e.g., and may not combine one or more additional data streams of the plurality of data streams). The network entity 105-*b* may select the matrix based on one or more singular values associated with a channel (e.g., a PDSCH) between the network entity 105-*b* and the UE 115-*b*. The network entity 105-*b* may select the matrix based on an SNR of each respective data stream of the plurality of data streams. The network entity 105-*b* may select the matrix based on one or more of power constraints, UE capabilities (e.g., the capability of the UE 115-*b* to demodulate one or more non-orthogonal data streams), or one or more complexity constraints.

In some examples, the network entity 105-*b* may select a new matrix α. For example, the network entity 105-*b* may receive or determine one or more new singular values associated with the channel. The network entity 105-*b* may select the new matrix α based on the one or more new singular values.

At 315, the network entity 105-*b* may transmit, to the UE 115-*b*, information associated with transmission of the plurality of data streams over a plurality of layers. The information may include an indication of one or more non-orthogonal data streams (e.g., data streams that are combined via the matrix α) and one or more orthogonal data streams (e.g., data streams that are not combined via the matrix α). In some examples, the network entity 105-*b* may transmit the information via a PDCCH (e.g., a PDCCH scheduling the plurality of data streams). The information may be in a DCI, RRC, or MAC-CE message.

In some examples, at 320, the UE 115-*b* may transmit, to the network entity 105-*b*, an acknowledgement message associated with the information. The acknowledgement message may indicate that the UE 115-*b* received the information associated with transmission of the plurality of data streams. The UE 115-*b* may transmit the acknowledgement message via the PUCCH or the PUSCH.

At 325, the network entity 105-*b* may transmit the plurality of data streams to the UE 115-*b*. The network entity 105-*b* may precode the plurality of data streams using the matrix α, and may transmit the orthogonal and non-orthogonal data streams to the UE 115-*b*. The network entity 105-*b* may transmit the plurality of data streams via the channel (e.g., via the PDSCH).

In some examples, at 330, the UE 115-*b* may select one or more demodulators to demodulate the orthogonal data streams and the non-orthogonal data streams. For example, the UE 115-*b* may select a first demodulator to demodulate the one or more orthogonal data streams (e.g., MMSE) and a second demodulator (e.g., PSRD) to demodulate the one or more non-orthogonal data streams. In some examples, the UE 115-*b* may use a same demodulator (e.g., PSRD) to demodulate both of the one or more orthogonal data streams and the one or more non-orthogonal data streams. In such examples, the UE 115-*b* may use a first quantity of hypotheses to demodulate the one or more orthogonal data streams and a second quantity of hypotheses (e.g., greater than the first quantity) to demodulate the one or more non-orthogonal data streams.

At 335, the UE 115-*b* may demodulate the plurality of data streams. The UE 115-*b* may demodulate the one or more orthogonal data streams and the one or more non-orthogonal data streams (e.g., using the one or more selected demodulators). The UE 115-*b* may demodulate the plurality of data streams based on the indication of the one or more orthogonal data streams and the one or more non-orthogonal data streams.

Figure 4:
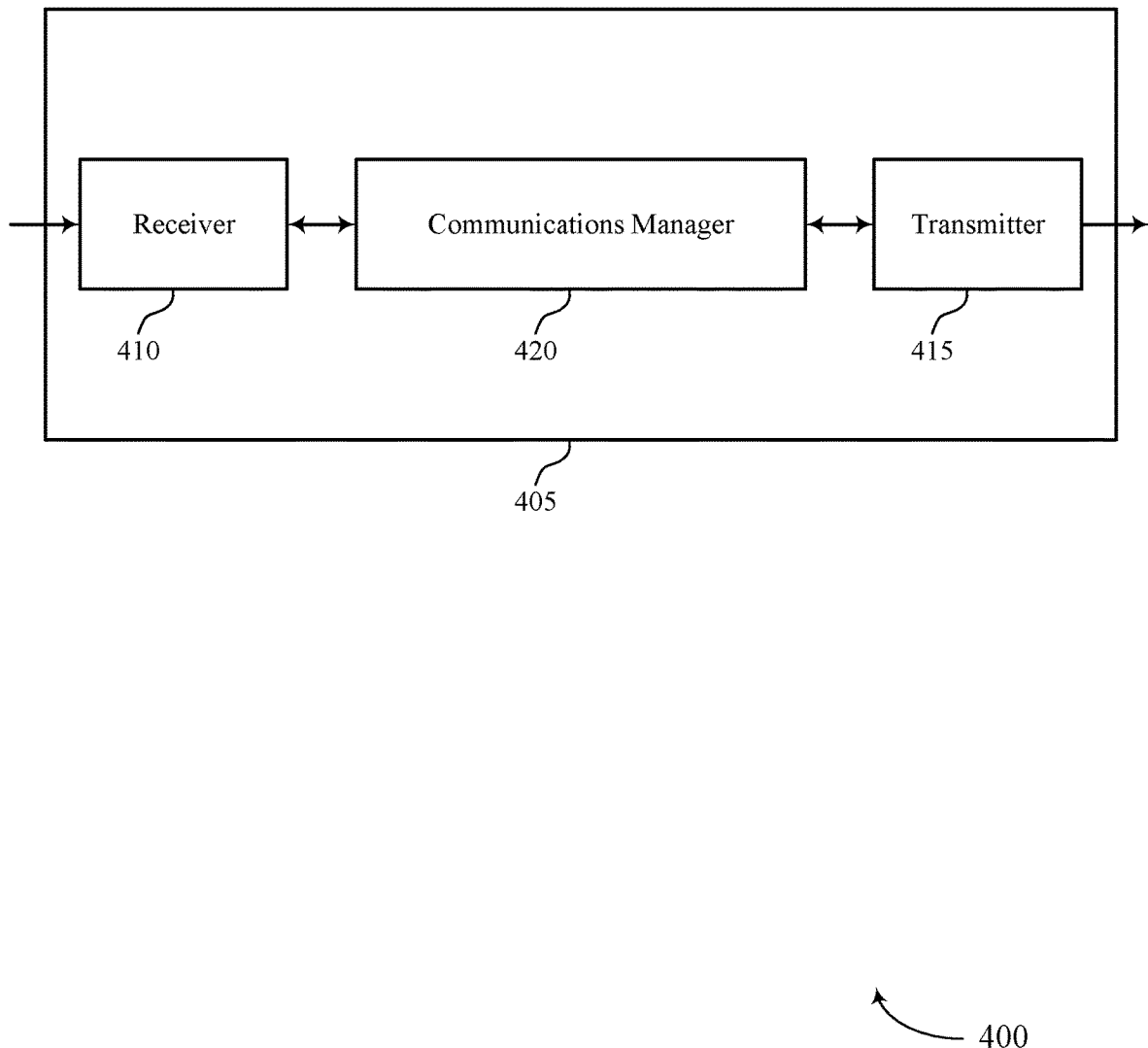
FIGS. 4 and 5 show block diagrams of devices that support SNR balancing using SVD combiner precoder matrices in accordance with one or more aspects of the present disclosure.

FIG. 4 shows a block diagram 400 of a device 405 that supports SNR balancing using SVD combiner precoder matrices in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, and the communications manager 420), may include at least one processor, which may be coupled with at least one memory, to, individually or collectively, support or enable the described techniques. Each of these components may be in communication with one another (e.g., via one or more buses).

The receiver 410 may provide a means for receiving information such as packets, user data, control information, or any combination thereof associated with various information channels (e.g., control channels, data channels, information channels related to SNR balancing using singular value combiner precoder matrices). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to SNR balancing using singular value combiner precoder matrices). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of SNR balancing using singular value combiner precoder matrices as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor. If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications in accordance with examples as disclosed herein. For example, the communications manager 420 is capable of, configured to, or operable to support a means for receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams. The communications manager 420 is capable of, configured to, or operable to support a means for receiving, from the network entity, the set of multiple data streams. The communications manager 420 is capable of, configured to, or operable to support a means for demodulating the set of multiple data streams based on the indication.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for dynamically combining or not combining data streams, which may allow for reduced processing related to less complex demodulation.

Figure 5:
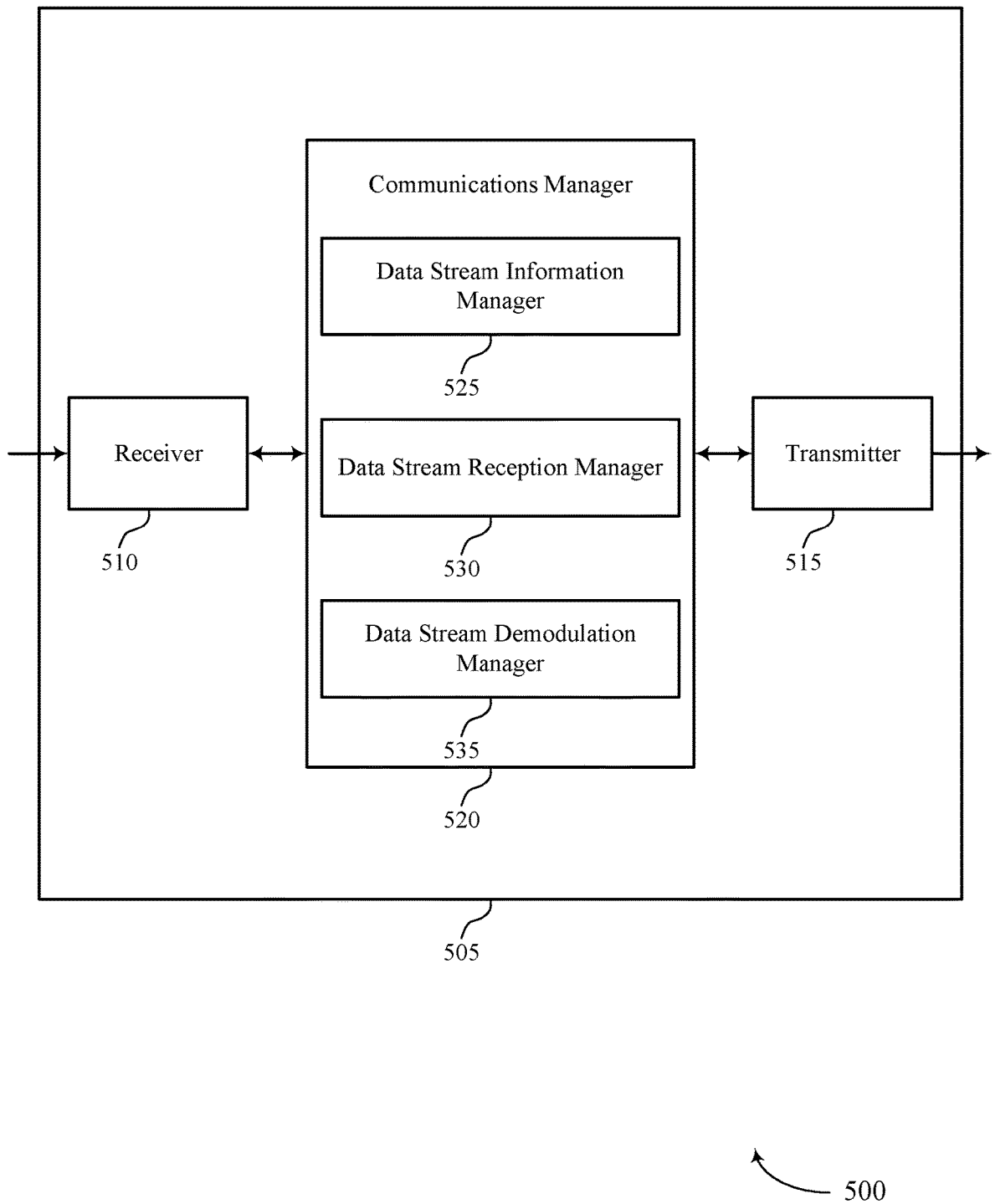

FIG. 5 shows a block diagram 500 of a device 505 that supports SNR balancing using SVD combiner precoder matrices in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to support the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to SNR balancing using singular value combiner precoder matrices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to SNR balancing using singular value combiner precoder matrices). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of SNR balancing using singular value combiner precoder matrices as described herein. For example, the communications manager 520 may include a data stream information manager 525, a data stream reception manager 530, a data stream demodulation manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. The data stream information manager 525 is capable of, configured to, or operable to support a means for receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams. The data stream reception manager 530 is capable of, configured to, or operable to support a means for receiving, from the network entity, the set of multiple data streams. The data stream demodulation manager 535 is capable of, configured to, or operable to support a means for demodulating the set of multiple data streams based on the indication.

Figure 6:
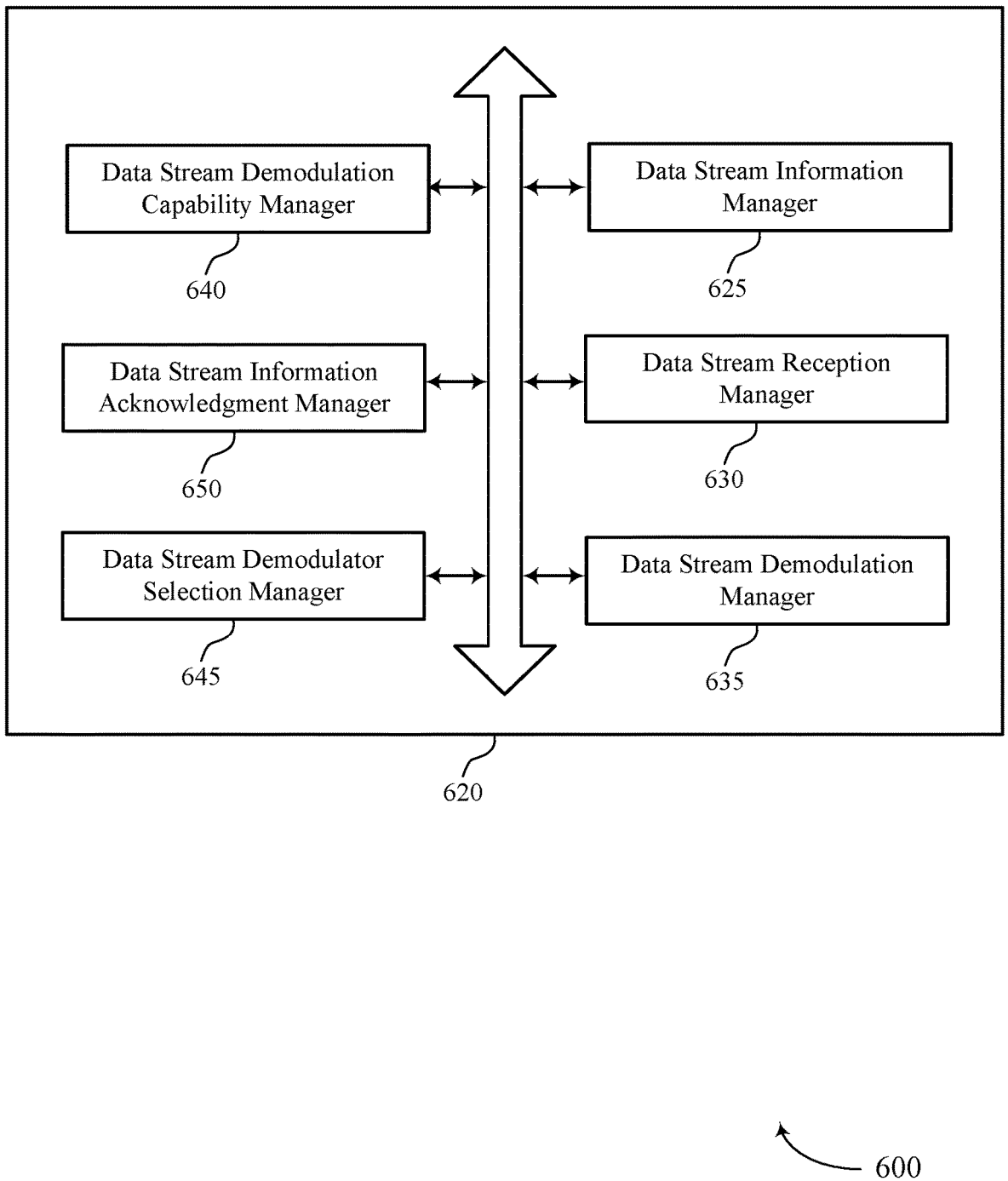
FIG. 6 shows a block diagram of a communications manager that supports SNR balancing using SVD combiner precoder matrices in accordance with one or more aspects of the present disclosure.

FIG. 6 shows a block diagram 600 of a communications manager 620 that supports SNR balancing using SVD combiner precoder matrices in accordance with one or more aspects of the present disclosure. The communications manager 620 may be an example of aspects of a communications manager 420, a communications manager 520, or both, as described herein. The communications manager 620, or various components thereof, may be an example of means for performing various aspects of SNR balancing using singular value combiner precoder matrices as described herein. For example, the communications manager 620 may include a data stream information manager 625, a data stream reception manager 630, a data stream demodulation manager 635, a data stream demodulation capability manager 640, a data stream demodulator selection manager 645, a data stream information acknowledgment manager 650, or any combination thereof. Each of these components, or components or subcomponents thereof (e.g., one or more processors, one or more memories), may communicate, directly or indirectly, with one another (e.g., via one or more buses).

The communications manager 620 may support wireless communications in accordance with examples as disclosed herein. In some examples, the data stream demodulation capability manager 640 is capable of, configured to, or operable to support a means for transmitting, to a network entity, a capability message indicating a capability of the UE to demodulate one or more non-orthogonal data streams.

The data stream information manager 625 is capable of, configured to, or operable to support a means for receiving, from the network entity, information associated with transmission of a set of multiple data streams over a set of multiple layers, where the information includes an indication of one or more orthogonal data streams of the set of multiple data streams and one or more non-orthogonal data streams of the set of multiple data streams.

In some examples, the data stream information acknowledgment manager 650 is capable of, configured to, or operable to support a means for transmitting, to the network entity, an acknowledgement message in response to the information associated with transmission of the set of multiple data streams.

The data stream reception manager 630 is capable of, configured to, or operable to support a means for receiving, from the network entity, the set of multiple data streams. The data stream demodulation manager 635 is capable of, configured to, or operable to support a means for demodulating the set of multiple data streams based on the indication.

In some examples, the data stream demodulator selection manager 645 is capable of, configured to, or operable to support a means for selecting one or more demodulators based on the indication and based on one or more capabilities of the UE, where the set of multiple data streams are demodulated using the one or more demodulators.

In some examples, to support demodulating the set of multiple data streams, the data stream demodulation manager 635 is capable of, configured to, or operable to support a means for demodulating the one or more non-orthogonal data streams using a first demodulator and demodulating the one or more orthogonal data streams using a second demodulator.

In some examples, to support demodulating the set of multiple data streams, the data stream demodulation manager 635 is capable of, configured to, or operable to support a means for demodulating the one or more non-orthogonal data streams using a first demodulator with a first quantity of hypotheses and demodulating the one or more orthogonal data streams using the first demodulator with a second quantity of hypotheses.

In some examples, the information associated with transmission of the set of multiple data streams is received via a physical downlink control channel.

In some examples, the information associated with transmission of the set of multiple data streams is received via a control message scheduling the set of multiple data streams.

In some examples, the set of multiple data streams are received via a physical downlink shared channel.

Figure 7:
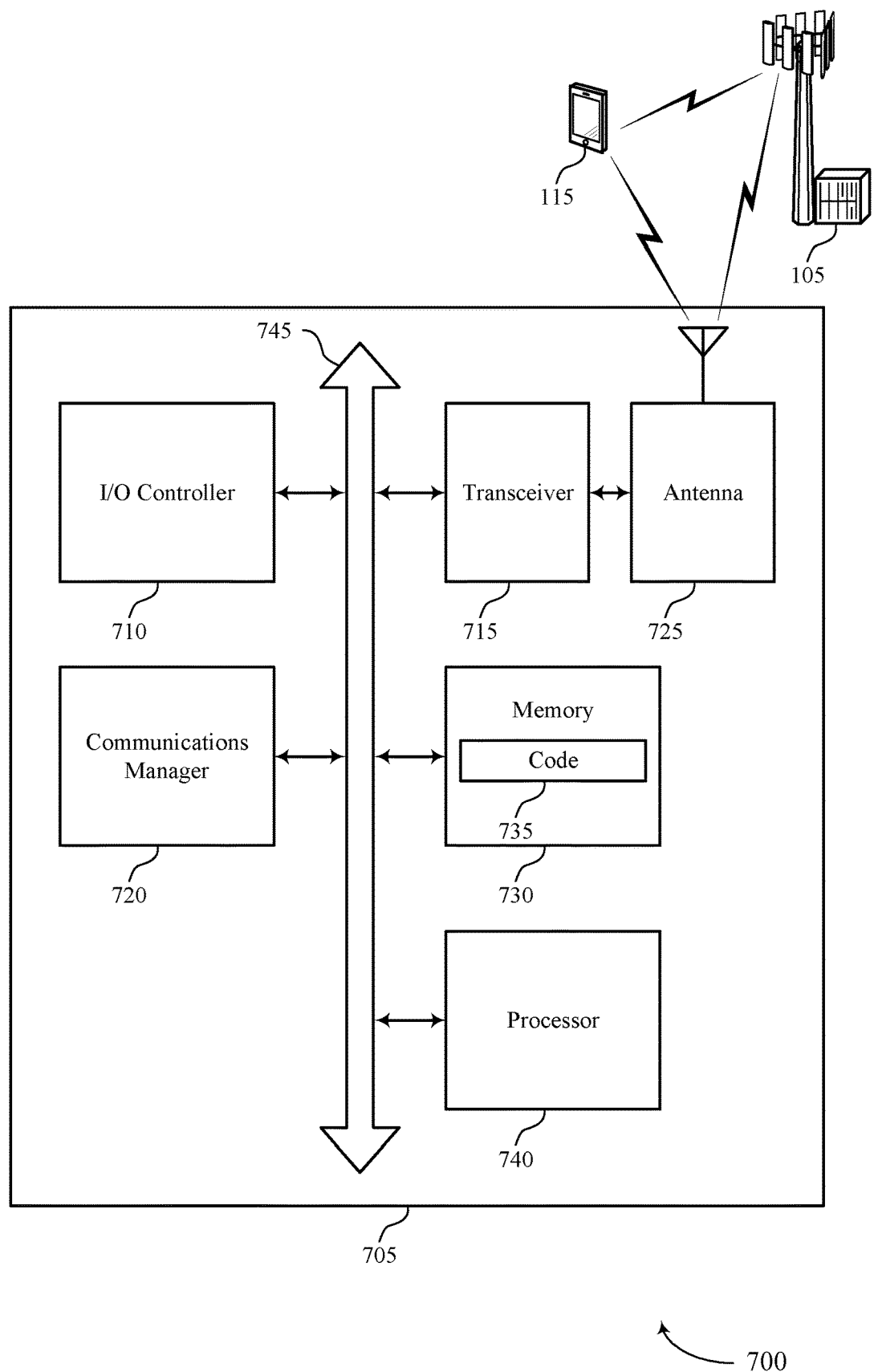
FIG. 7 shows a diagram of a system including a device that supports SNR balancing using SVD combiner precoder matrices in accordance with one or more aspects of the present disclosure.

FIG. 7 shows a diagram of a system 700 including a device 705 that supports SNR balancing using SVD combiner precoder matrices in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable code 735 including instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may contain, among other things, a basic I/O system (BIOS) which may control basic hardware or software operation such as the interaction with peripheral components or devices.

The at least one processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting SNR balancing using singular value combiner precoder matrices). For example, the device 705 or a component of the device 705 may include at least one processor 740 and at least one memory 730 coupled with or to the at least one processor 740, the at least one processor 740 and at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. As such, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code stored in the at least one memory 730 or otherwise, to perform one or more of the functions described herein.

The communications manager 720 may support wireless communications in accordance with examples as disclosed herein. For example, the communications manager 720 is capable of, configured to, or operable to support a means for receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams. The communications manager 720 is capable of, configured to, or operable to support a means for receiving, from the network entity, the set of multiple data streams. The communications manager 720 is capable of, configured to, or operable to support a means for demodulating the set of multiple data streams based on the indication.

By including or configuring the communications manager 720 in accordance with examples as described herein, the device 705 may support techniques for dynamically combining or not combining data streams, which may allow for improved communication reliability, reduced latency improved coordination between devices, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of SNR balancing using singular value combiner precoder matrices as described herein, or the at least one processor 740 and the at least one memory 730 may be otherwise configured to, individually or collectively, perform or support such operations.

Figure 8:
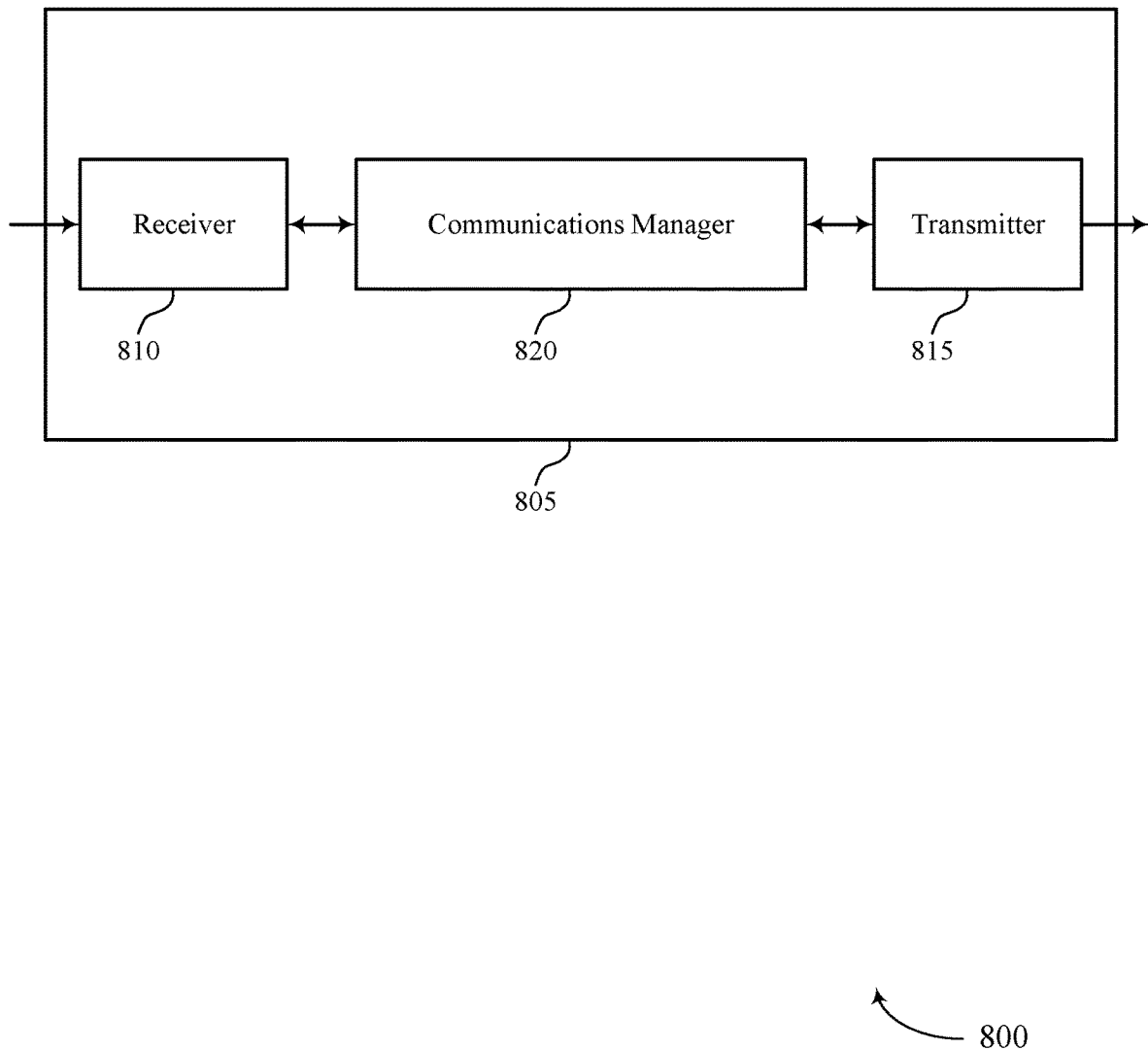
FIGS. 8 and 9 show block diagrams of devices that support SNR balancing using SVD combiner precoder matrices in accordance with one or more aspects of the present disclosure.

FIG. 8 shows a block diagram 800 of a device 805 that supports SNR balancing using SVD combiner precoder matrices in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of SNR balancing using singular value combiner precoder matrices as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams. The communications manager 820 is capable of, configured to, or operable to support a means for transmitting, to the UE, the set of multiple data streams.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for dynamically combining or not combining data streams, which may allow for reduced processing related to less complex demodulation.

Figure 9:
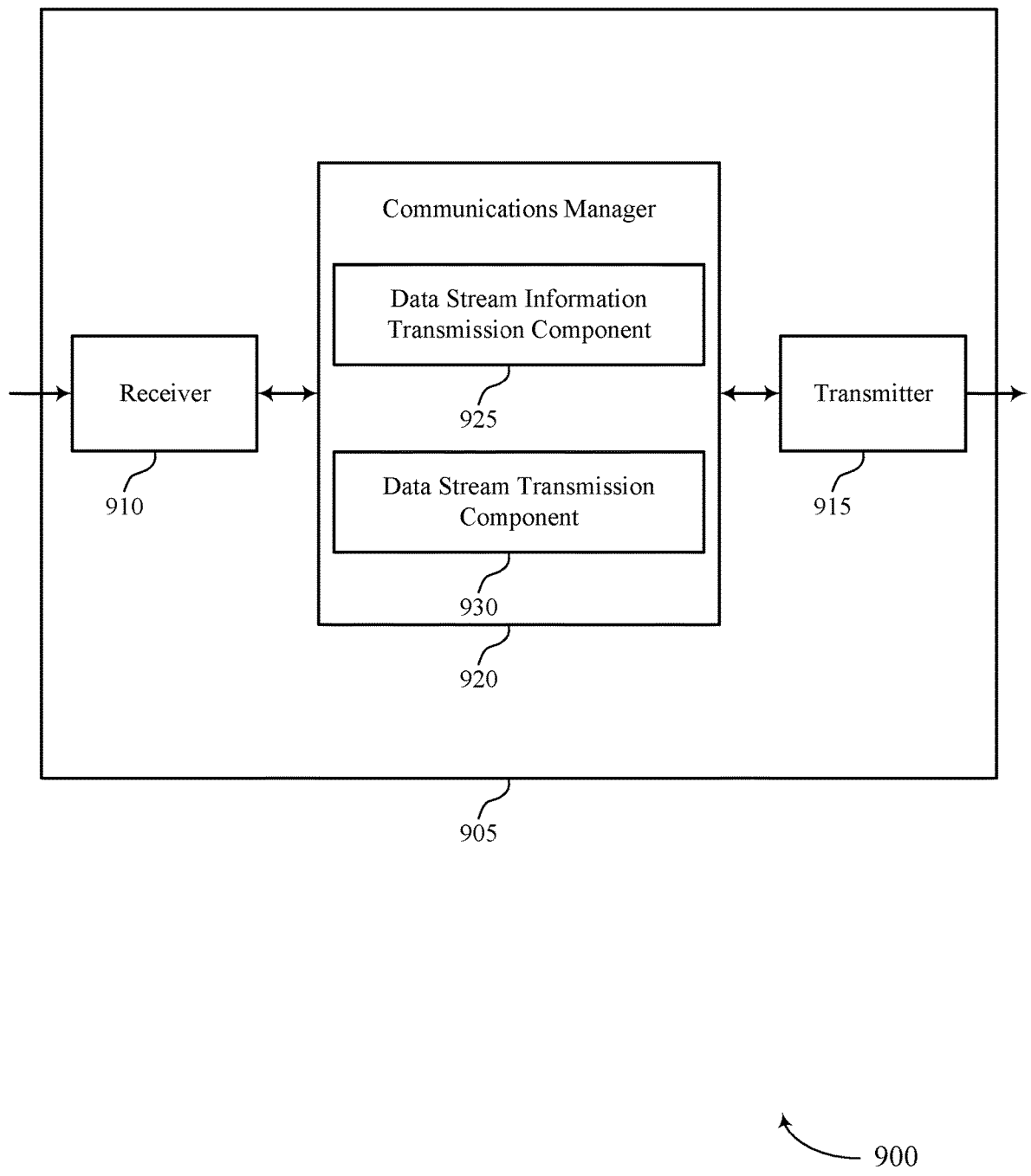

FIG. 9 shows a block diagram 900 of a device 905 that supports SNR balancing using SVD combiner precoder matrices in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of SNR balancing using singular value combiner precoder matrices as described herein. For example, the communications manager 920 may include a data stream information transmission component 925 a data stream transmission component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The data stream information transmission component 925 is capable of, configured to, or operable to support a means for transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams. The data stream transmission component 930 is capable of, configured to, or operable to support a means for transmitting, to the UE, the set of multiple data streams.

Figure 10:
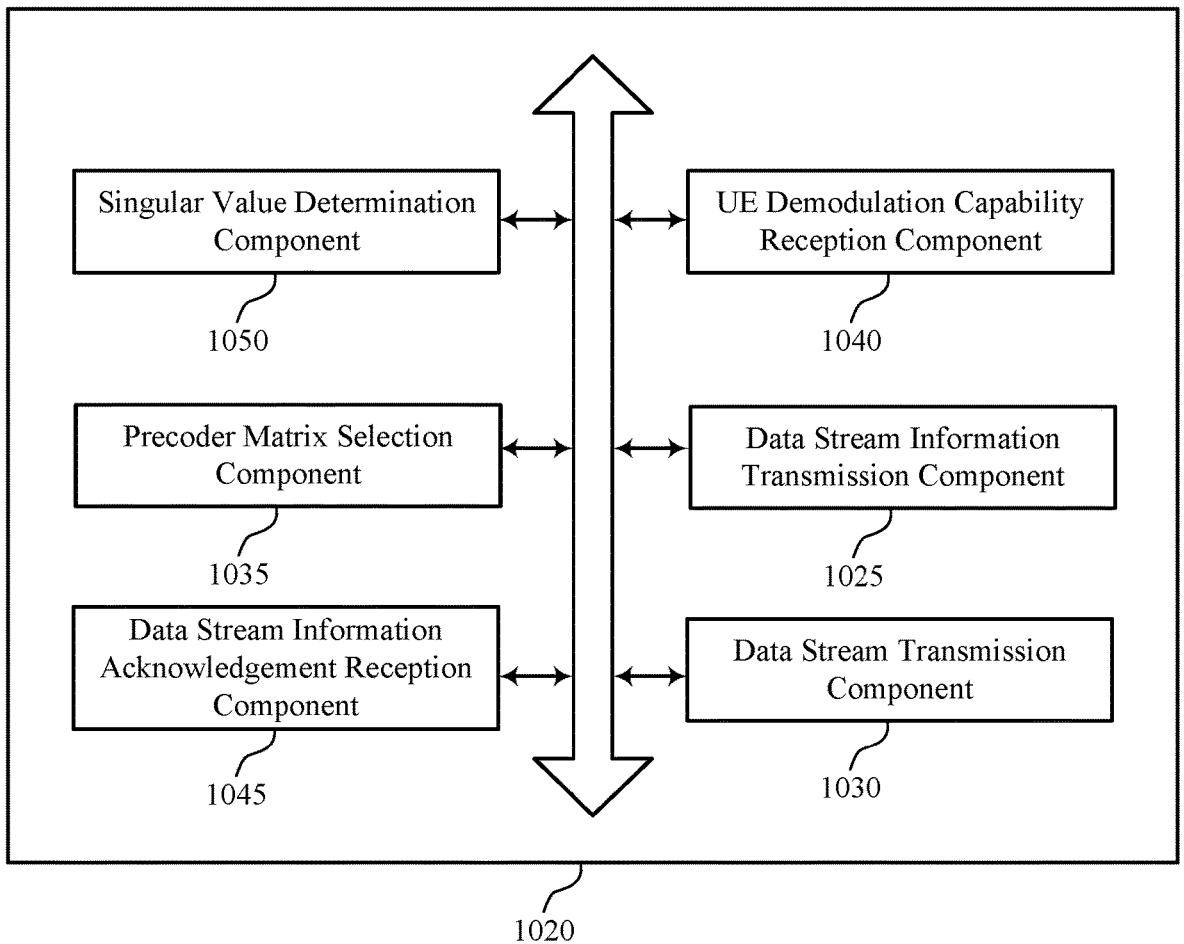
FIG. 10 shows a block diagram of a communications manager that supports SNR balancing using SVD combiner precoder matrices in accordance with one or more aspects of the present disclosure.

FIG. 10 shows a block diagram 1000 of a communications manager 1020 that supports SNR balancing using SVD combiner precoder matrices in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of SNR balancing using singular value combiner precoder matrices as described herein. For example, the communications manager 1020 may include a data stream information transmission component 1025, a data stream transmission component 1030, a precoder matrix selection component 1035, a UE demodulation capability reception component 1040, a data stream information acknowledgement reception component 1045, a singular value determination component 1050, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications in accordance with examples as disclosed herein. In some examples, the singular value determination component 1050 is capable of, configured to, or operable to support a means for determining one or more singular values associated with a channel. In some examples, the precoder matrix selection component 1035 is capable of, configured to, or operable to support a means for selecting a matrix based on the one or more singular values.

In some examples, the UE demodulation capability reception component 1040 is capable of, configured to, or operable to support a means for receiving, from a UE, a capability message indicating a capability of the UE to demodulate one or more non-orthogonal data streams.

In some examples, the precoder matrix selection component 1035 is capable of, configured to, or operable to support a means for selecting the matrix based on the one or more singular values associated with the channel between the network entity and the UE, where a set of multiple data streams are transmitted via the channel.

The data stream information transmission component 1025 is capable of, configured to, or operable to support a means for transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams.

In some examples, the data stream information acknowledgement reception component 1045 is capable of, configured to, or operable to support a means for receiving, from the UE, an acknowledgement message in response to the information associated with transmission of the set of multiple data streams.

The data stream transmission component 1030 is capable of, configured to, or operable to support a means for transmitting, to the UE, the set of multiple data streams.

In some examples, the matrix is selected based on a SNR associated with each respective data stream of the set of multiple data streams.

In some examples, the matrix is selected based on one or more power constraints, one or more capabilities of the UE, one or more complexity constraints, or some combination thereof.

In some examples, the information associated with transmission of the set of multiple data streams is transmitted via a physical downlink control channel.

In some examples, the information associated with transmission of the set of multiple data streams is transmitted via a control message scheduling the set of multiple data streams.

In some examples, the set of multiple data streams are transmitted via a physical downlink shared channel.

Figure 11:
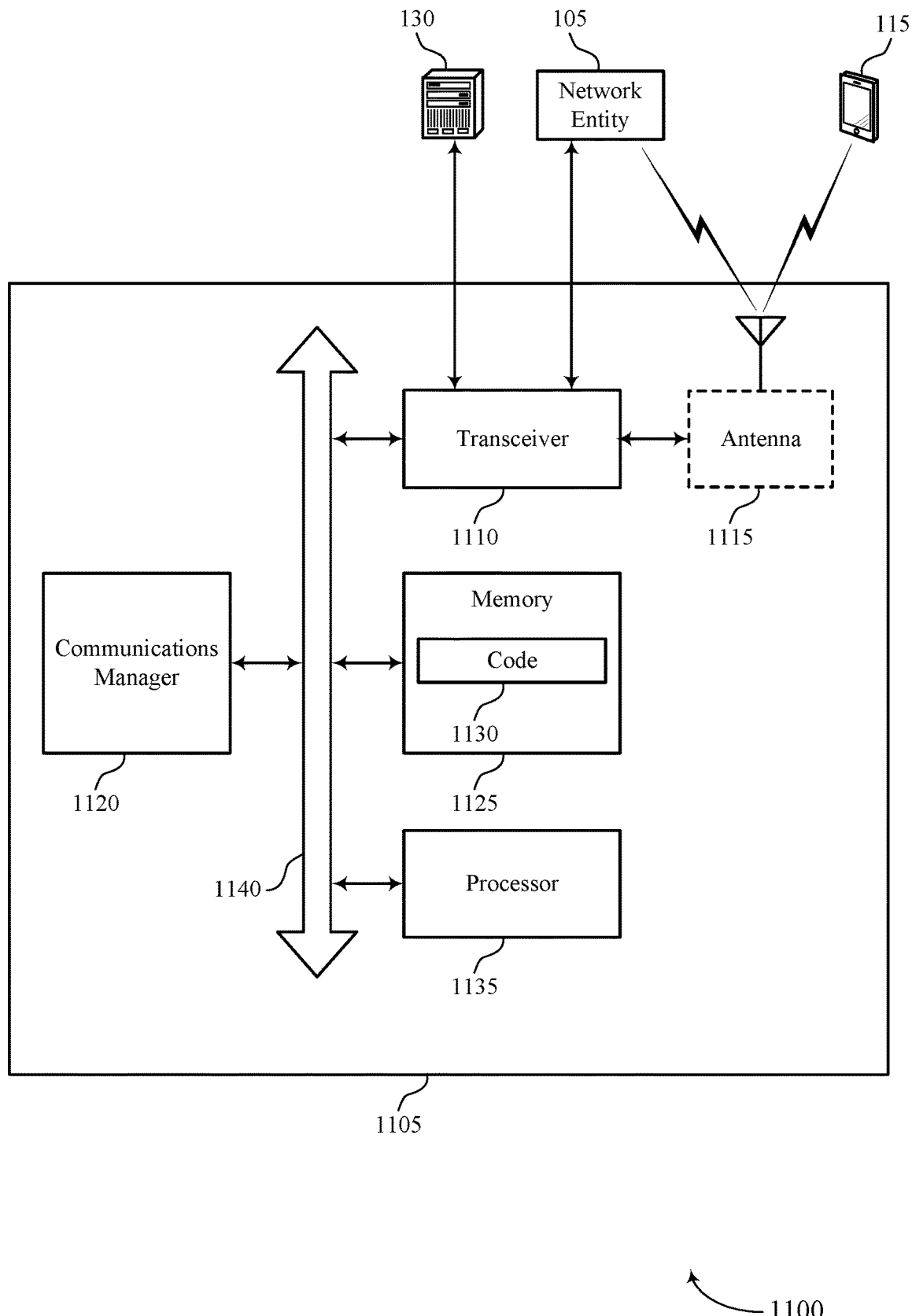
FIG. 11 shows a diagram of a system including a device that supports SNR balancing using SVD combiner precoder matrices in accordance with one or more aspects of the present disclosure.

FIG. 11 shows a diagram of a system 1100 including a device 1105 that supports SNR balancing using SVD combiner precoder matrices in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, at least one memory 1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., a communication link 125, a backhaul communication link 120, a midhaul communication link 162, a fronthaul communication link 168).

The at least one memory 1125 may include RAM, ROM, or any combination thereof. The at least one memory 1125 may store computer-readable, computer-executable code 1130 including instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may contain, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting SNR balancing using singular value combiner precoder matrices). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. As such, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications in accordance with examples as disclosed herein. For example, the communications manager 1120 is capable of, configured to, or operable to support a means for transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams. The communications manager 1120 is capable of, configured to, or operable to support a means for transmitting, to the UE, the set of multiple data streams.

By including or configuring the communications manager 1120 in accordance with examples as described herein, the device 1105 may support techniques for dynamically combining or not combining data streams, which may allow for improved communication reliability, improved user experience related to reduced processing, reduced power consumption, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of SNR balancing using singular value combiner precoder matrices as described herein, or the at least one processor 1135 and the at least one memory 1125 may be otherwise configured to, individually or collectively, perform or support such operations.

Figure 12:
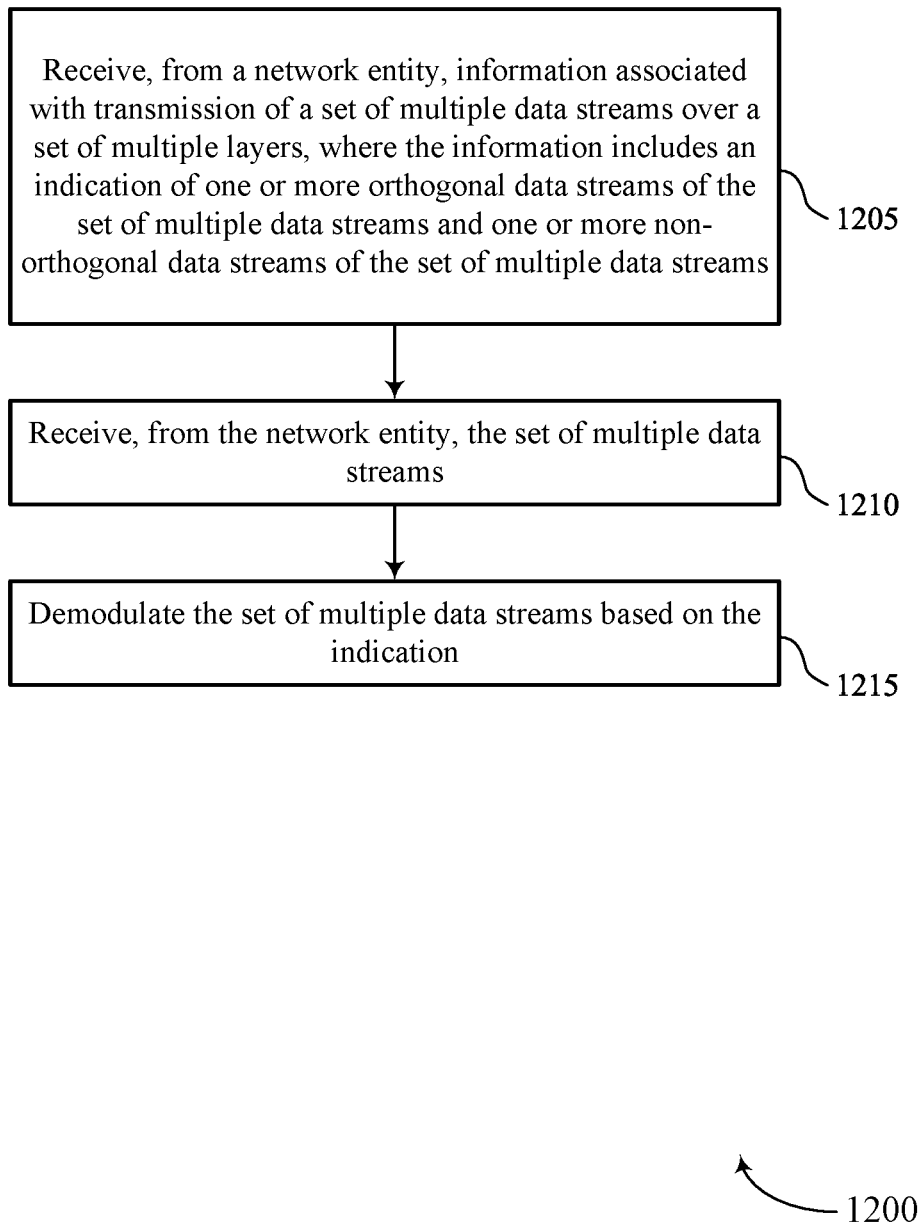
FIGS. 12 through 16 show flowcharts illustrating methods that support SNR balancing using SVD combiner precoder matrices in accordance with one or more aspects of the present disclosure.

FIG. 12 shows a flowchart illustrating a method 1200 that supports SNR balancing using SVD combiner precoder matrices in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams. The operations of 1205 may be performed in accordance with examples as disclosed herein. In some examples, aspects of the operations of 1205 may be performed by a data stream information manager 625 as described with reference to FIG. 6.

At 1210, the method may include receiving, from the network entity, the set of multiple data streams. The operations of 1210 may be performed in accordance with examples as disclosed herein. In some examples, aspects of the operations of 1210 may be performed by a data stream reception manager 630 as described with reference to FIG. 6.

At 1215, the method may include demodulating the set of multiple data streams based on the indication. The operations of 1215 may be performed in accordance with examples as disclosed herein. In some examples, aspects of the operations of 1215 may be performed by a data stream demodulation manager 635 as described with reference to FIG. 6.

Figure 13:
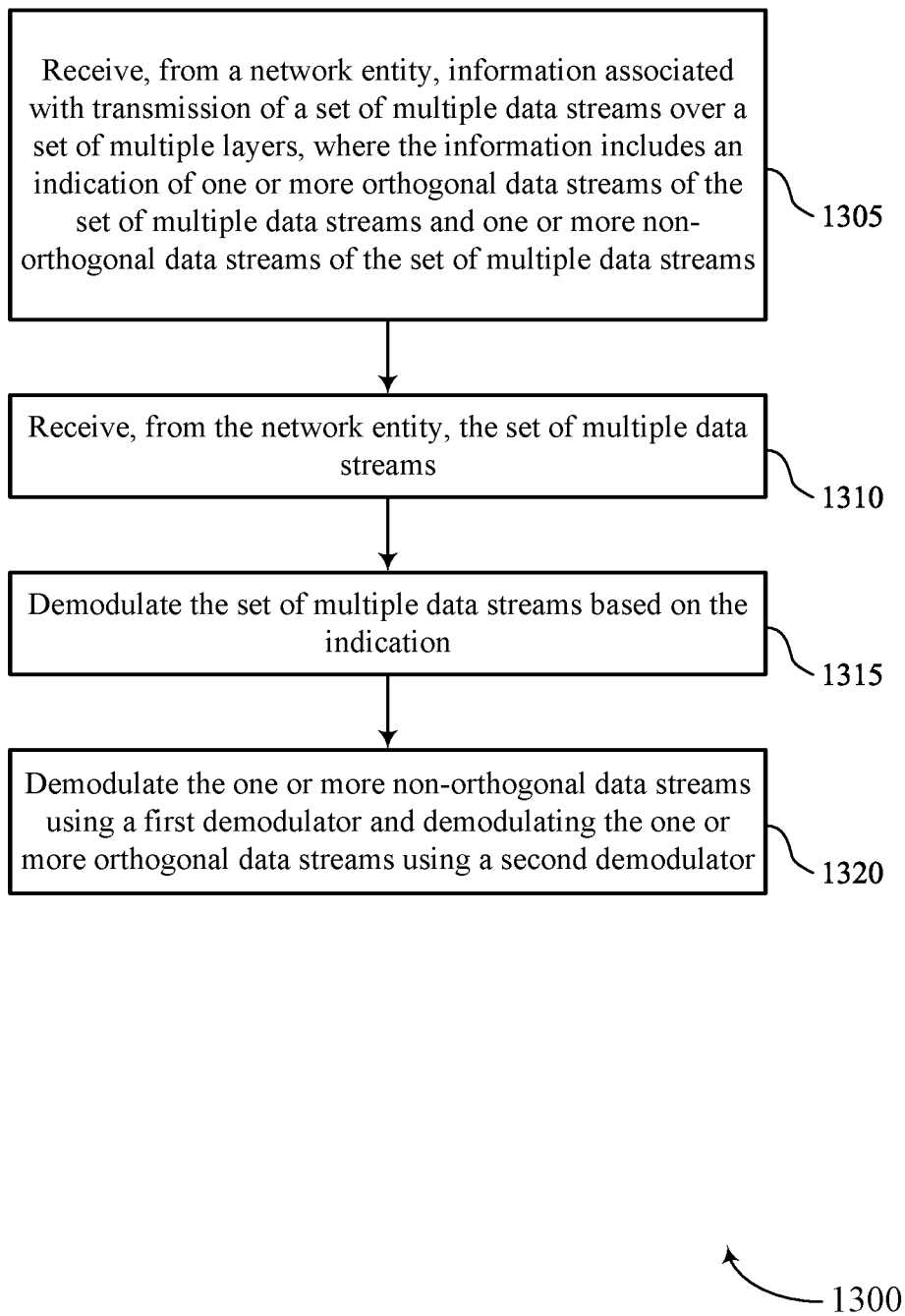

FIG. 13 shows a flowchart illustrating a method 1300 that supports SNR balancing using SVD combiner precoder matrices in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams. The operations of 1305 may be performed in accordance with examples as disclosed herein. In some examples, aspects of the operations of 1305 may be performed by a data stream information manager 625 as described with reference to FIG. 6.

At 1310, the method may include receiving, from the network entity, the set of multiple data streams. The operations of 1310 may be performed in accordance with examples as disclosed herein. In some examples, aspects of the operations of 1310 may be performed by a data stream reception manager 630 as described with reference to FIG. 6.

At 1315, the method may include demodulating the set of multiple data streams based on the indication. The operations of 1315 may be performed in accordance with examples as disclosed herein. In some examples, aspects of the operations of 1315 may be performed by a data stream demodulation manager 635 as described with reference to FIG. 6.

At 1320, the method may include demodulating the one or more non-orthogonal data streams using a first demodulator and demodulating the one or more orthogonal data streams using a second demodulator. The operations of 1320 may be performed in accordance with examples as disclosed herein. In some examples, aspects of the operations of 1320 may be performed by a data stream demodulation manager 635 as described with reference to FIG. 6.

Figure 14:
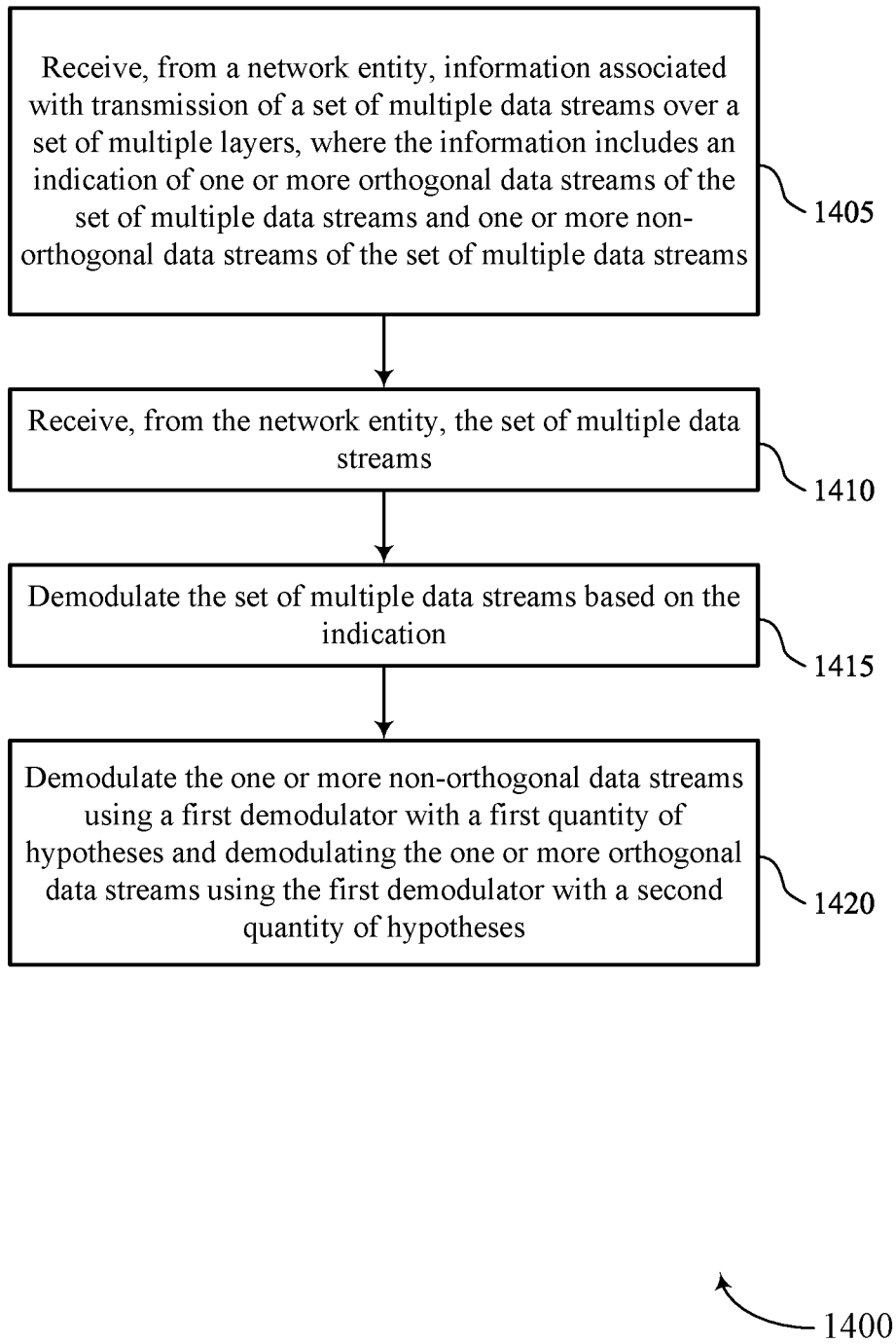

FIG. 14 shows a flowchart illustrating a method 1400 that supports SNR balancing using SVD combiner precoder matrices in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, information associated with transmission of a set of multiple data streams over a set of multiple layers, where the information includes an indication of one or more orthogonal data streams of the set of multiple data streams and one or more non-orthogonal data streams of the set of multiple data streams. The operations of 1405 may be performed in accordance with examples as disclosed herein. In some examples, aspects of the operations of 1405 may be performed by a data stream information manager 625 as described with reference to FIG. 6.

At 1410, the method may include receiving, from the network entity, the set of multiple data streams. The operations of 1410 may be performed in accordance with examples as disclosed herein. In some examples, aspects of the operations of 1410 may be performed by a data stream reception manager 630 as described with reference to FIG. 6.

At 1415, the method may include demodulating the set of multiple data streams based on the indication. The operations of 1415 may be performed in accordance with examples as disclosed herein. In some examples, aspects of the operations of 1415 may be performed by a data stream demodulation manager 635 as described with reference to FIG. 6.

At 1420, the method may include demodulating the one or more non-orthogonal data streams using a first demodulator with a first quantity of hypotheses and demodulating the one or more orthogonal data streams using the first demodulator with a second quantity of hypotheses. The operations of 1420 may be performed in accordance with examples as disclosed herein. In some examples, aspects of the operations of 1420 may be performed by a data stream demodulation manager 635 as described with reference to FIG. 6.

Figure 15:
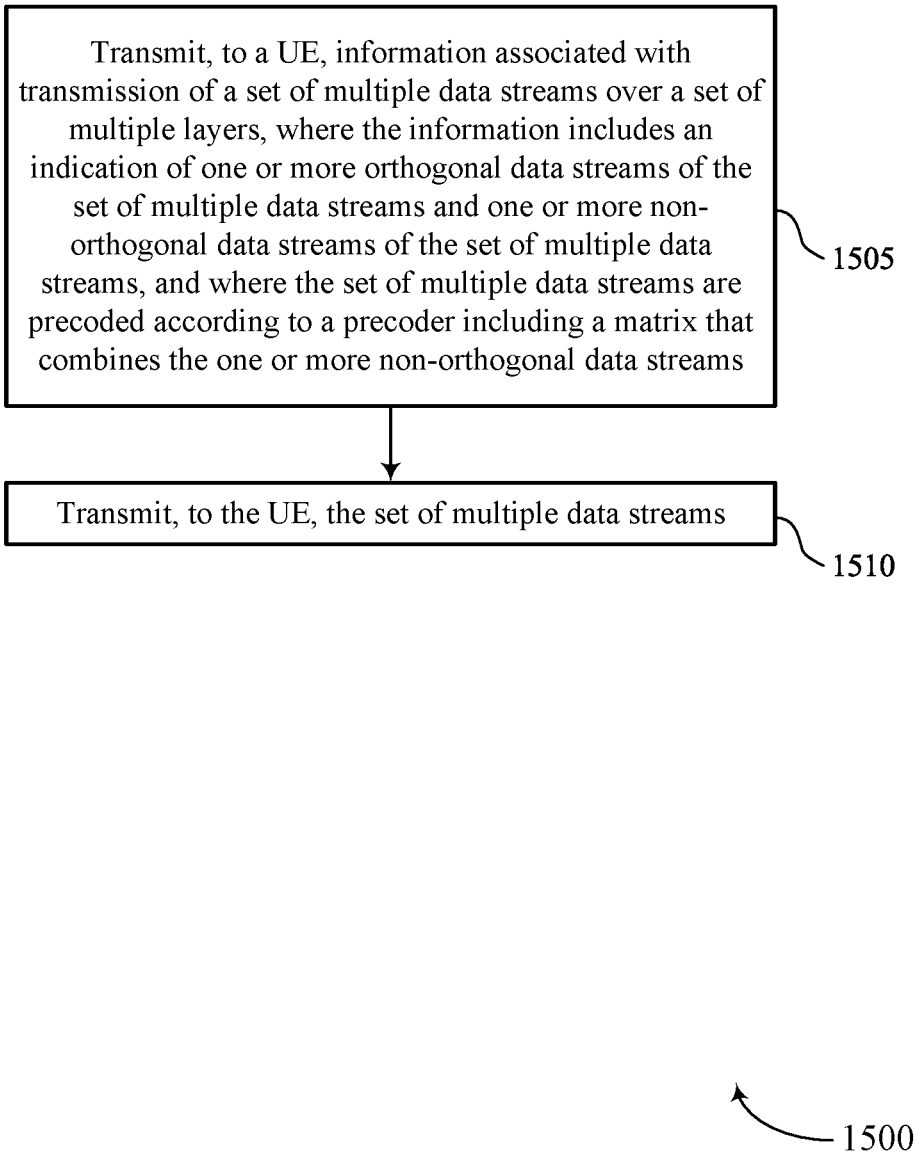

FIG. 15 shows a flowchart illustrating a method 1500 that supports SNR balancing using SVD combiner precoder matrices in accordance with aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams. The operations of 1505 may be performed in accordance with examples as disclosed herein. In some examples, aspects of the operations of 1505 may be performed by a data stream information transmission component 1025 as described with reference to FIG. 10.

At 1510, the method may include transmitting, to the UE, the set of multiple data streams. The operations of 1510 may be performed in accordance with examples as disclosed herein. In some examples, aspects of the operations of 1510 may be performed by a data stream transmission component 1030 as described with reference to FIG. 10.

Figure 16:
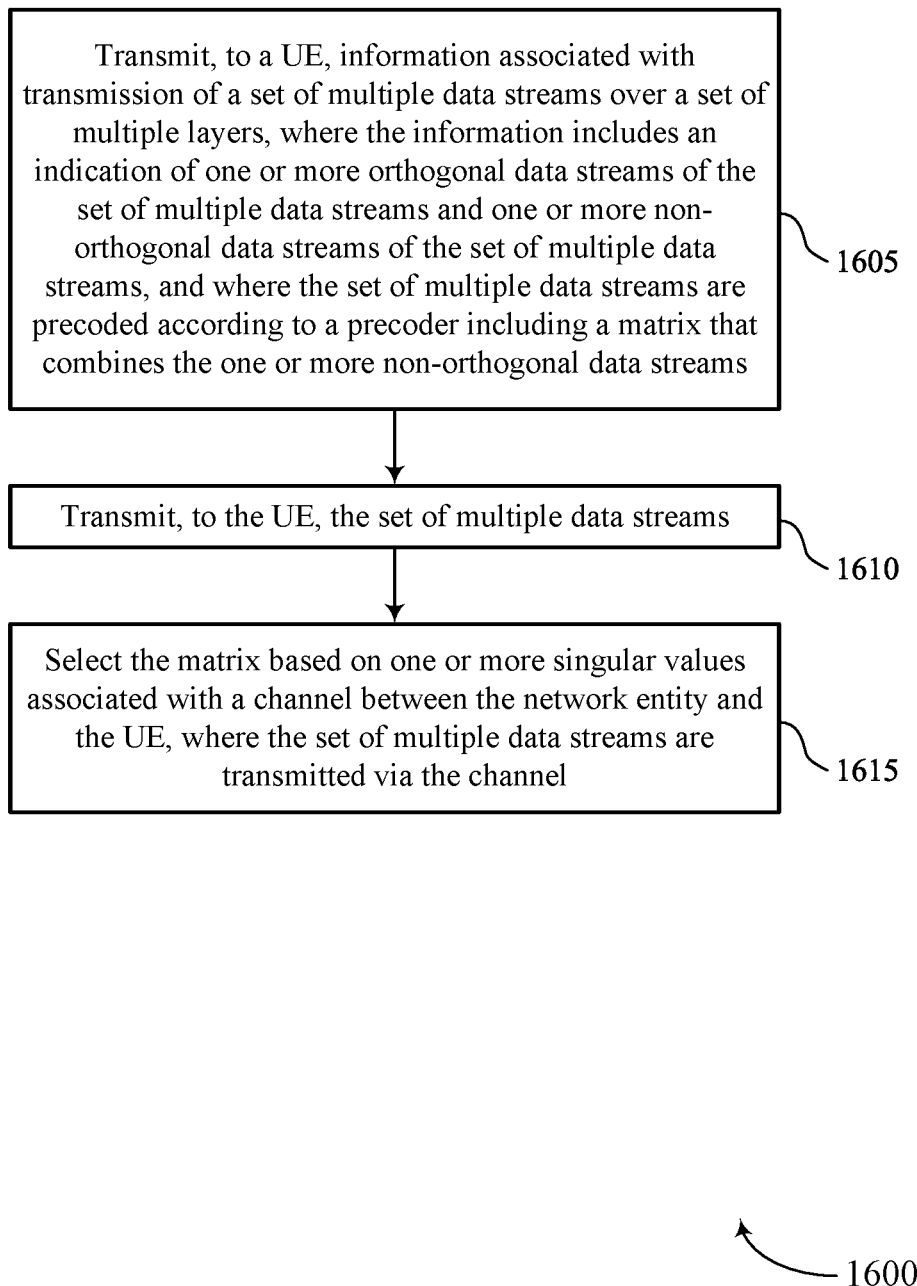

FIG. 16 shows a flowchart illustrating a method 1600 that supports SNR balancing using SVD combiner precoder matrices in accordance with aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, information associated with transmission of a set of multiple data streams over a set of multiple layers, where the information includes an indication of one or more orthogonal data streams of the set of multiple data streams and one or more non-orthogonal data streams of the set of multiple data streams, and where the set of multiple data streams are precoded according to a precoder including a matrix that combines the one or more non-orthogonal data streams. The operations of 1605 may be performed in accordance with examples as disclosed herein. In some examples, aspects of the operations of 1605 may be performed by a data stream information transmission component 1025 as described with reference to FIG. 10.

At 1610, the method may include transmitting, to the UE, the set of multiple data streams. The operations of 1610 may be performed in accordance with examples as disclosed herein. In some examples, aspects of the operations of 1610 may be performed by a data stream transmission component 1030 as described with reference to FIG. 10.

At 1615, the method may include selecting the matrix based on one or more singular values associated with a channel between the network entity and the UE, where the set of multiple data streams are transmitted via the channel. The operations of 1615 may be performed in accordance with examples as disclosed herein. In some examples, aspects of the operations of 1615 may be performed by a precoder matrix selection component 1035 as described with reference to FIG. 10.

The following provides an overview of aspects of the present disclosure:

Aspect 1: A method for wireless communications by a UE, comprising: receiving, from a network entity, information associated with transmission of a plurality of data streams over a plurality of layers, wherein the information comprises an indication of one or more orthogonal data streams of the plurality of data streams and one or more non-orthogonal data streams of the plurality of data streams; receiving, from the network entity, the plurality of data streams; and demodulating the plurality of data streams based at least in part on the indication.

Aspect 2: The method of aspect 1, wherein demodulating the plurality of data streams comprises: demodulating the one or more non-orthogonal data streams using a first demodulator and demodulating the one or more orthogonal data streams using a second demodulator.

Aspect 3: The method of aspect 1, wherein demodulating the plurality of data streams comprises: demodulating the one or more non-orthogonal data streams using a first demodulator with a first quantity of hypotheses and demodulating the one or more orthogonal data streams using the first demodulator with a second quantity of hypotheses.

Aspect 4: The method of any of aspects 1 through 3, further comprising: transmitting, to the network entity, a capability message indicating a capability of the UE to demodulate the one or more non-orthogonal data streams.

Aspect 5: The method of any of aspects 1 through 4, further comprising: selecting one or more demodulators based at least in part on the indication and based at least in part on one or more capabilities of the UE, wherein the plurality of data streams are demodulated using the one or more demodulators.

Aspect 6: The method of any of aspects 1 through 5, further comprising: transmitting, to the network entity, an acknowledgement message in response to the information associated with transmission of the plurality of data streams.

Aspect 7: The method of any of aspects 1 through 6, wherein the information associated with transmission of the plurality of data streams is received via a PDCCH.

Aspect 8: The method of aspect 7, wherein the information associated with transmission of the plurality of data streams is received via a control message scheduling the plurality of data streams.

Aspect 9: The method of any of aspects 1 through 8, wherein the plurality of data streams are received via a PDSCH.

Aspect 10: A method for wireless communications by a network entity, comprising: transmitting, to a UE, information associated with transmission of a plurality of data streams over a plurality of layers, wherein the information comprises an indication of one or more orthogonal data streams of the plurality of data streams and one or more non-orthogonal data streams of the plurality of data streams, and wherein the plurality of data streams are precoded according to a precoder comprising a matrix that combines the one or more non-orthogonal data streams; and transmitting, to the UE, the plurality of data streams.

Aspect 11: The method of aspect 10, further comprising: selecting the matrix based at least in part on one or more singular values associated with a channel between the network entity and the UE, wherein the plurality of data streams are transmitted via the channel.

Aspect 12: The method of aspect 11, wherein the matrix is selected based at least in part on a SNR associated with each respective data stream of the plurality of data streams.

Aspect 13: The method of any of aspects 11 through 12, wherein the matrix is selected based at least in part on one or more power constraints, one or more capabilities of the UE, one or more complexity constraints, or some combination thereof.

Aspect 14: The method of any of aspects 11 through 13, further comprising: determining one or more new singular values associated with the channel; and selecting a new matrix based at least in part on the one or more new singular values.

Aspect 15: The method of any of aspects 10 through 14, further comprising: receiving, from the UE, a capability message indicating a capability of the UE to demodulate the one or more non-orthogonal data streams.

Aspect 16: The method of any of aspects 10 through 15, further comprising: receiving, from the UE, an acknowledgement message in response to the information associated with transmission of the plurality of data streams.

Aspect 17: The method of any of aspects 10 through 16, wherein the information associated with transmission of the plurality of data streams is transmitted via a PDCCH.

Aspect 18: The method of aspect 17, wherein the information associated with transmission of the plurality of data streams is transmitted via a control message scheduling the plurality of data streams.

Aspect 19: The method of any of aspects 10 through 18, wherein the plurality of data streams are transmitted via a PDSCH.

Aspect 20: A UE for wireless communications, comprising one or more memories storing processor-executable code, and one or more processors coupled with the one or more memories and individually or collectively operable to execute the code to cause the UE to perform a method of any of aspects 1 through 9.

Aspect 21: A UE for wireless communications, comprising at least one means for performing a method of any of aspects 1 through 9.

Aspect 22: A non-transitory computer-readable medium storing code for wireless communications, the code comprising instructions executable by a processor to perform a method of any of aspects 1 through 9.

Aspect 23: A network entity for wireless communications, comprising one or more memories storing processor-executable code, and one or more processors coupled with the one or more memories and individually or collectively operable to execute the code to cause the network entity to perform a method of any of aspects 10 through 19.

Aspect 24: A network entity for wireless communications, comprising at least one means for performing a method of any of aspects 10 through 19.

Aspect 25: A non-transitory computer-readable medium storing code for wireless communications, the code comprising instructions executable by a processor to perform a method of any of aspects 10 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive, from a network entity, information associated with transmission of a plurality of data streams over a plurality of layers, wherein the information comprises an indication of one or more orthogonal data streams of the plurality of data streams and one or more non-orthogonal data streams of the plurality of data streams;
receive, from the network entity, the plurality of data streams; and
demodulate both of the one or more orthogonal data streams and the one or more non-orthogonal data streams of the plurality of data streams based at least in part on the indication.

2. The UE of claim 1, wherein, to demodulate the plurality of data streams, the one or more processors are individually or collectively operable to execute the code to cause the UE to:
demodulate the one or more non-orthogonal data streams using a first demodulator and demodulating the one or more orthogonal data streams using a second demodulator.

3. The UE of claim 1, wherein, to demodulate the plurality of data streams, the one or more processors are individually or collectively operable to execute the code to cause the UE to:
demodulate the one or more non-orthogonal data streams using a first demodulator with a first quantity of hypotheses and demodulating the one or more orthogonal data streams using the first demodulator with a second quantity of hypotheses.

4. The UE of claim 1, wherein the one or more processors are individually or collectively further operable to execute the code to cause the UE to:
transmit, to the network entity, a capability message indicating a capability of the UE to demodulate the one or more non-orthogonal data streams.

5. The UE of claim 1, wherein the one or more processors are individually or collectively further operable to execute the code to cause the UE to:
select one or more demodulators based at least in part on the indication and based at least in part on one or more capabilities of the UE, wherein the plurality of data streams are demodulated using the one or more demodulators.

6. The UE of claim 1, wherein the one or more processors are individually or collectively further operable to execute the code to cause the UE to:
transmit, to the network entity, an acknowledgement message in response to the information associated with transmission of the plurality of data streams.

7. The UE of claim 1, wherein the information associated with transmission of the plurality of data streams is received via a physical downlink control channel.

8. The UE of claim 7, wherein the information associated with transmission of the plurality of data streams is received via a control message scheduling the plurality of data streams.

9. The UE of claim 1, wherein the plurality of data streams are received via a physical downlink shared channel.

10. A network entity, comprising:
one or more memories storing processor-executable code; and
one or more processors coupled with the one or more memories and individually or collectively operable to execute the code to cause the network entity to:
transmit, to a user equipment (UE), information associated with transmission of a plurality of data streams over a plurality of layers, wherein the information comprises an indication of one or more orthogonal data streams of the plurality of data streams and one or more non-orthogonal data streams of the plurality of data streams, and wherein the plurality of data streams are precoded according to a precoder comprising a matrix that combines the one or more non-orthogonal data streams; and
transmit, to the UE, the plurality of data streams for demodulation by the UE.

11. The network entity of claim 10, wherein the one or more processors are individually or collectively further operable to execute the code to cause the network entity to:
select the matrix based at least in part on one or more singular values associated with a channel between the network entity and the UE, wherein the plurality of data streams are transmitted via the channel.

12. The network entity of claim 11, wherein the matrix is selected based at least in part on a signal-to-noise ratio associated with each respective data stream of the plurality of data streams.

13. The network entity of claim 11, wherein the matrix is selected based at least in part on one or more power constraints, one or more capabilities of the UE, one or more complexity constraints, or some combination thereof.

14. The network entity of claim 11, wherein the one or more processors are individually or collectively further operable to execute the code to cause the network entity to:
determine one or more new singular values associated with the channel; and
select a new matrix based at least in part on the one or more new singular values.

15. The network entity of claim 10, wherein the one or more processors are individually or collectively further operable to execute the code to cause the network entity to:
receive, from the UE, a capability message indicating a capability of the UE to demodulate the one or more non-orthogonal data streams.

16. The network entity of claim 10, wherein the one or more processors are individually or collectively further operable to execute the code to cause the network entity to:
receive, from the UE, an acknowledgement message in response to the information associated with transmission of the plurality of data streams.

17. The network entity of claim 10, wherein the information associated with transmission of the plurality of data streams is transmitted via a physical downlink control channel.

18. The network entity of claim 17, wherein the information associated with transmission of the plurality of data streams is transmitted via a control message scheduling the plurality of data streams.

19. The network entity of claim 10, wherein the plurality of data streams are transmitted via a physical downlink shared channel.

20. A method for wireless communications by a user equipment (UE), comprising:
receiving, from a network entity, information associated with transmission of a plurality of data streams over a plurality of layers, wherein the information comprises an indication of one or more orthogonal data streams of the plurality of data streams and one or more non-orthogonal data streams of the plurality of data streams;
receiving, from the network entity, the plurality of data streams; and
demodulating both of the one or more orthogonal data streams and the one or more non-orthogonal data streams of the plurality of data streams based at least in part on the indication.

21. The method of claim 20, wherein demodulating the plurality of data streams comprises:
demodulating the one or more non-orthogonal data streams using a first demodulator and demodulating the one or more orthogonal data streams using a second demodulator.

22. The method of claim 20, wherein demodulating the plurality of data streams comprises:
demodulating the one or more non-orthogonal data streams using a first demodulator with a first quantity of hypotheses and demodulating the one or more orthogonal data streams using the first demodulator with a second quantity of hypotheses.

23. The method of claim 20, further comprising:
transmitting, to the network entity, a capability message indicating a capability of the UE to demodulate the one or more non-orthogonal data streams.

24. The method of claim 20, further comprising:
selecting one or more demodulators based at least in part on the indication and based at least in part on one or more capabilities of the UE, wherein the plurality of data streams are demodulated using the one or more demodulators.

25. The method of claim 20, wherein the information associated with transmission of the plurality of data streams is received via a physical downlink control channel.

26. The method of claim 25, wherein the information associated with transmission of the plurality of data streams is received via a control message scheduling the plurality of data streams.

27. The method of claim 20, wherein the plurality of data streams are received via a physical downlink shared channel.

28. A method for wireless communications by a network entity, comprising:
transmitting, to a user equipment (UE), information associated with transmission of a plurality of data streams over a plurality of layers, wherein the information comprises an indication of one or more orthogonal data streams of the plurality of data streams and one or more non-orthogonal data streams of the plurality of data streams, and wherein the plurality of data streams are precoded according to a precoder comprising a matrix that combines the one or more non-orthogonal data streams; and transmitting, to the UE, the plurality of data streams for demodulation by the UE.

29. The method of claim 28, further comprising:

selecting the matrix based at least in part on one or more singular values associated with a channel between the network entity and the UE, wherein the plurality of data streams are transmitted via the channel.

30. The method of claim 29, wherein the matrix is selected based at least in part on a signal-to-noise ratio associated with each respective data stream of the plurality of data streams.

* * * * *